United States Patent
Tsunoda

(10) Patent No.: US 11,494,164 B2
(45) Date of Patent: Nov. 8, 2022

(54) ARITHMETIC PROCESSING UNIT, STORAGE MEDIUM, AND ARITHMETIC PROCESSING METHOD

(71) Applicant: FUJITSU LIMITED, Kawasaki (JP)

(72) Inventor: Yukito Tsunoda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 16/776,562

(22) Filed: Jan. 30, 2020

(65) Prior Publication Data
US 2020/0264841 A1  Aug. 20, 2020

(30) Foreign Application Priority Data
Feb. 19, 2019  (JP) .............................. JP2019-027432

(51) Int. Cl.
*G06F 7/544* (2006.01)
*G06N 20/00* (2019.01)
*G06N 5/04* (2006.01)

(52) U.S. Cl.
CPC ............... *G06F 7/544* (2013.01); *G06N 5/04* (2013.01); *G06N 20/00* (2019.01)

(58) Field of Classification Search
CPC ...... G06F 7/544; G06F 30/27; G06F 2111/06; G06F 2119/10; G06N 3/08; G06N 3/126;
(Continued)

(56) References Cited

U.S. PATENT DOCUMENTS

| 10,360,517 B2 * | 7/2019 | Koch ..................... G06N 3/126 |
| 2002/0156752 A1 | 10/2002 | Torii et al. |

(Continued)

FOREIGN PATENT DOCUMENTS

| JP | 2002-312755 A | 10/2002 |
| JP | 2003-508835 A | 3/2003 |
| JP | 2018-29860 A | 3/2018 |

OTHER PUBLICATIONS

Gaurav, Dinesh Dileep et al., "A Fast Eigen Solution for Homogeneous Quadratic Minimization With at Most Three Constraints", IEEE Signal Processing Letters, vol. 20, No. 10, Oct. 2013, pp. 968-971, XP011525940.
(Continued)

*Primary Examiner* — Le H Luu
(74) *Attorney, Agent, or Firm* — Fujitsu Patent Center

(57) ABSTRACT

An arithmetic processing apparatus includes a memory; and a processor coupled to the memory and the processor configured to execute a prediction process and a search process in an evolutionary calculation process for searching an optimum value of inputs by calculating an objective function based on eigen solutions for inputs and repeatedly calculating the objective function, wherein the prediction process includes predicting a range of an eigen solution for a second input, which satisfies a predetermined eigen solution condition, based on a first eigen solution for a first input when searches an optimum value of inputs by calculating an objective function based on eigen solutions for inputs and repeatedly calculating the objective function, and the search process includes searching a second eigen solution for the second input, which satisfies the eigen solution condition, in the predicted range of the eigen solution.

7 Claims, 18 Drawing Sheets

(58) Field of Classification Search
CPC ........ G06N 3/0454; G06N 5/04; G06N 20/00; F04B 51/00; G02B 5/284; G16B 25/00; G16B 5/30; H04B 7/10; H04J 14/04; H04R 3/12
See application file for complete search history.

(56) References Cited

U.S. PATENT DOCUMENTS

| | | | |
|---|---|---|---|
| 2002/0174079 A1 | 11/2002 | Mathias et al. | |
| 2005/0260663 A1* | 11/2005 | Solomon | G16B 5/30 435/6.19 |
| 2006/0129034 A1* | 6/2006 | Kasabov | G16B 25/00 128/920 |
| 2008/0215512 A1* | 9/2008 | Narzisi | G06N 3/126 706/13 |
| 2008/0228680 A1* | 9/2008 | Chen | G06N 3/0454 706/21 |
| 2012/0239358 A1 | 9/2012 | Yiu | |
| 2017/0343750 A1* | 11/2017 | Ashrafi | H04J 14/04 |
| 2018/0089148 A1* | 3/2018 | Li | F04B 51/00 |
| 2018/0249248 A1* | 8/2018 | Harris | H04R 3/12 |
| 2018/0262243 A1* | 9/2018 | Ashrafi | H04B 7/10 |
| 2019/0013558 A1* | 1/2019 | Itoh | G02B 5/284 |

OTHER PUBLICATIONS

Lei, Hou et al., "The Eigen-Solution For The Micro-Structure And Macro-Structure In Non-Newtonian Material", 2012 IEEE Symposium on Robotics and Applications (ISRA), Jun. 3, 2012, pp. 82-84, XP032187268.

Extended European Search Report dated Jul. 1, 2020 for corresponding European Patent Application No. 20154599.3, 6 pages.

*Please note US-2002/0156752-A1 cited herewith, was previously cited in an IDS filed on Jan. 30, 2020.*.

* cited by examiner

FIG. 11

|  | x1 | x2 | x2 | ... | xn | $g(x_{km})$ |
|---|---|---|---|---|---|---|
| $x_{00}$ | 1 | 0 | 0 |  | 1 | 8 |
| $x_{01}$ | 0 | 0 | 1 |  | 0 | 10 |
| $x_{02}$ | 1 | 1 | 1 |  | 1 | 12 |
| ⋮ |  |  | ⋮ |  |  | ⋮ |
| $x_{ln}$ | 1 | 1 | 0 |  | 0 | 3 |

ARITHMETIC PROCESSING UNIT, STORAGE MEDIUM, AND ARITHMETIC PROCESSING METHOD

CROSS-REFERENCE TO RELATED APPLICATION

This application is based upon and claims the benefit of priority of the prior Japanese Patent Application No. 2019-27432, filed on Feb. 19, 2019, the entire contents of which are incorporated herein by reference.

FIELD

The embodiments discussed herein relate to an arithmetic processing unit and so on.

BACKGROUND

A genetic algorithm (GA) (see Japanese Laid-open Patent Publication No. 2002-312755, for example) has been known as one of evolutionary computation (EC). According to a genetic algorithm, for example, input values are converted to bit sequences and are generated randomly. Then, input values are selected (by keeping ones having a good characteristic) and crossover and mutations are repeated thereon to find an optimum input value.

A method has been known which applies evolutionary computation for designing an optimum structure. In order to acquire an optimum structure, performance evaluation is required to be performed. In order to perform the performance evaluation, an intensity distribution corresponding to the designed structure is required to be acquired. In order to acquire the intensity distribution, an eigen solution that satisfies an eigen solution condition is required to be calculated.

For example, a case where a structure having an arrangement of a surface acoustic wave (SAW) guide (signaling channel) with an optical SAW filter having a highest SAW application efficiency is to be acquired will be described with reference to FIGS. 15A and 15B and 16. FIGS. 15A and 15B are diagrams illustrating a reference example of an SAW intensity distribution with an optical SAW filter having a highest SAW application efficiency. Referring to FIGS. 15A and 15B, two types of SAW intensity distributions where SAW signaling channels are arranged differently are illustrated. The arrangement of SAW signaling channels with a highest SAW intensity on optical signaling channels of SAW guides is acquired to acquire a structure with a highest SAW application efficiency.

The SAW intensity distribution is acquired based on Expression (1).

SAW intensity distribution $S(z)$:

$$S(z) = \begin{cases} A_i \mathrm{Exp}\{K_i(z-zc_i)\} + B_i \mathrm{Exp}\{-K_i(z-zc_i)\} & (N_i < \mathit{Neff}) \\ A_i \mathrm{Cos}\{K_i(z-zc_i)\} + B_i \mathrm{Sin}\{-K_i(z-zc_i)\} & (N_i > \mathit{Neff}) \end{cases} \quad (1)$$

$$K_i k \sqrt{\left|N_i^2 - \mathit{Neff}^2\right|} \quad i: \text{Layer No.}$$

In order to acquire an SAW intensity distribution, an eigen solution that satisfies an eigen solution condition expressed by Expression (2) is required to be calculated. In this example, in order to acquire a proper SAW intensity distribution, an eigen solution that converges to zero ($B_1=0$, $A_n=0$) at both infinite distance is required to be calculated.

Eigen Solution Condition $$\begin{bmatrix} A_{n+1} \\ B_{n+1} \end{bmatrix} = \overline{M_{n+1}(zb_n)} \cdot M_n(zb_n) \cdot \overline{M_n(zb_{n-1})} \cdot M_{n-1}(zb_{n-1})$$

$$\ldots \overline{M_2(zb_1)} \cdot M_1(zb_1) \begin{bmatrix} A_1 \\ B_1 \end{bmatrix}$$

$$M_i(z) = \begin{bmatrix} P_i(z) & Q_i(z) \\ \dfrac{dP_i(z)}{dz} & \dfrac{dQ_i(z)}{dz} \end{bmatrix} \quad (2)$$

and $A_1=1$, $B_1=0$, $A_n=0$

FIG. 16 is a diagram illustrating a reference example exhibiting a relationship between an SAW intensity distribution and an eigen solution. FIG. 16 illustrates an SAW intensity distribution of a structure in which four SAW signaling channels are arranged. Referring to the upper diagram of FIG. 16, a value of z that converges to zero ($B_1=0$, $A_n=0$) at both infinite distance is acquired as an eigen solution by changing the value of z for an eigen equation for determining an SAW intensity distribution expressed by Expressions (1) and (2). Referring to the lower diagram of FIG. 16, a value of z that converges to zero ($B_1=0$, $A_n=0$) at both infinite distance is not acquired by changing the value of z for an eigen equation for determining an SAW intensity distribution expressed by Expressions (1) and (2). In other words, an eigen solution is not acquired, for example. Therefore, with the structure in which four SAW signaling channels are arranged, an eigen solution and an SAW intensity distribution are determined as in the upper diagram in FIG. 16.

After the eigen solution and intensity distribution corresponding to the structure are acquired, performance evaluation is performed on the structure based on the SAW intensity distribution for the structure. From the performance evaluations on the structures, a new structure is selected from the structures. A structure of the next generation is generated by crossover and mutations, and an optimum design structure is found. As Related art, for example, Japanese Laid-open Patent Publication No. 2002-312755, Japanese Laid-open Patent Publication No. 2018-29860, and Japanese Laid-open Patent Publication No. 2003-508835 are disclosed.

SUMMARY

According to an aspect of the embodiments, an arithmetic processing apparatus includes a memory; and a processor coupled to the memory and the processor configured to execute a prediction process and a search process in an evolutionary calculation process for searching an optimum value of inputs by calculating an objective function based on eigen solutions for inputs and repeatedly calculating the objective function, wherein the prediction process includes predicting a range of an eigen solution for a second input, which satisfies a predetermined eigen solution condition, based on a first eigen solution for a first input when searches an optimum value of inputs by calculating an objective function based on eigen solutions for inputs and repeatedly calculating the objective function, and the search process includes searching a second eigen solution for the second input, which satisfies the eigen solution condition, in the predicted range of the eigen solution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of an eigen solution information table according to Embodiment 3;

DESCRIPTION OF EMBODIMENTS

However, the method in the past applying evolutionary computation for designing an optimum structure, the amount of computational complexity of the evolutionary computation may not be reduced disadvantageously. In other words, the method in the past calculates an eigen solution required for acquiring the intensity distribution. In this case, a value of z that converges to zero ($B_1=0$, $A_n=0$) at both infinite distance is acquired by changing the value of z for the eigen equations expressed by Expressions (1) and (2). In other words, for example, in order to acquire an eigen solution, a value of z that converges to zero is calculated by changing, one by one, the value of z in the entire possible range of an eigen solution. This therefore requires a large amount of computational complexity for acquiring an eigen solution, which means that the entire amount of computational complexity of evolutionary computation may not be reduced.

It is an object of an aspect of the embodiments to reduce the amount of computational complexity of evolutionary computation.

Embodiments of an arithmetic processing unit, an arithmetic processing program and an arithmetic processing method disclosed herein will be described in detail with reference to drawings. In description of the embodiments, an optimum arrangement (structure design) of optical signaling channels with an optical SAW filter having a highest SAW application efficiency is to be acquired by evolutionary computation. However, the present disclosure is not limited to the embodiments.

Figure 17:
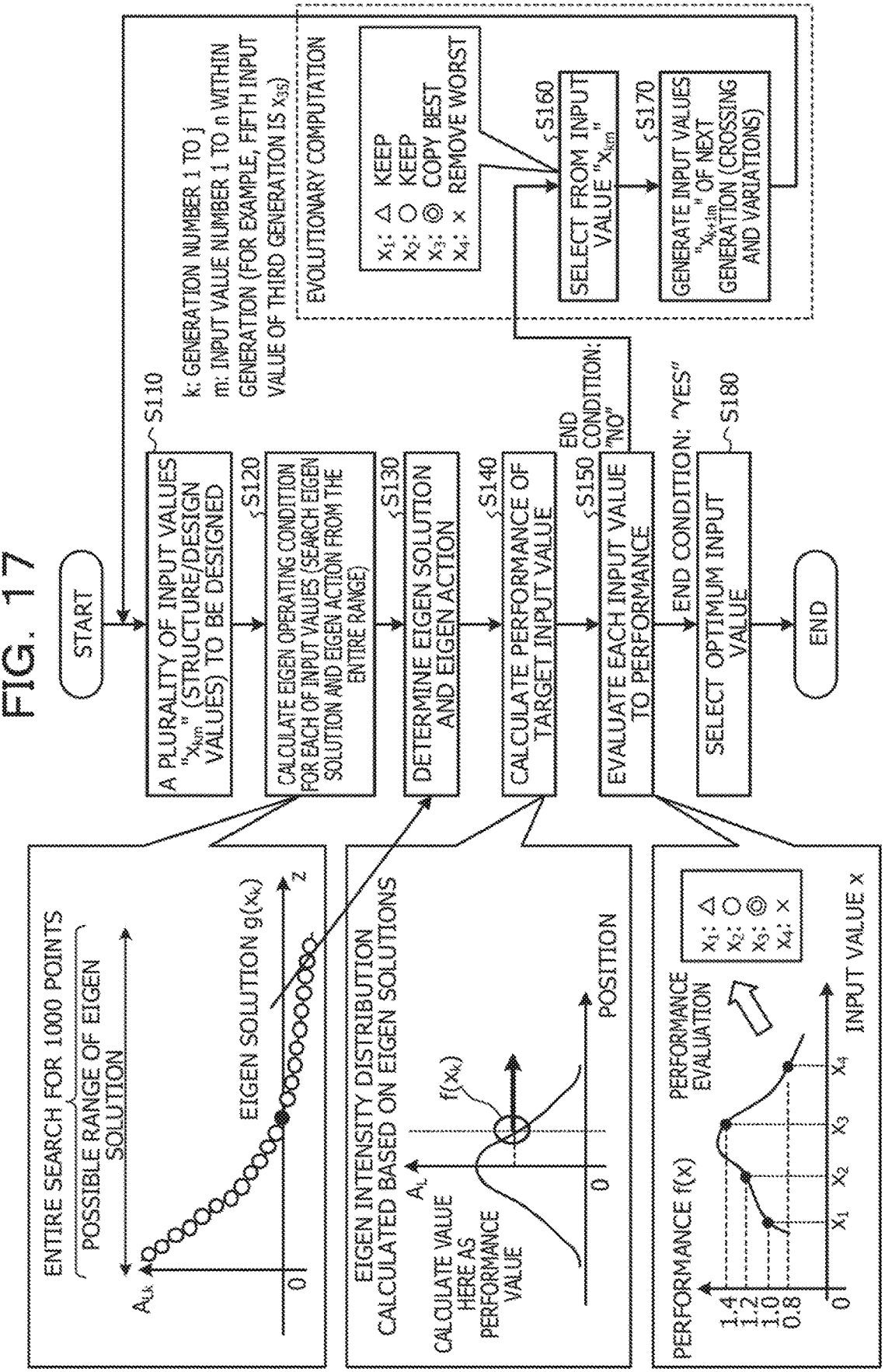
FIG. 17 is a diagram illustrating a reference example of a flowchart for structure design with evolutionary computation.
Figure 18:
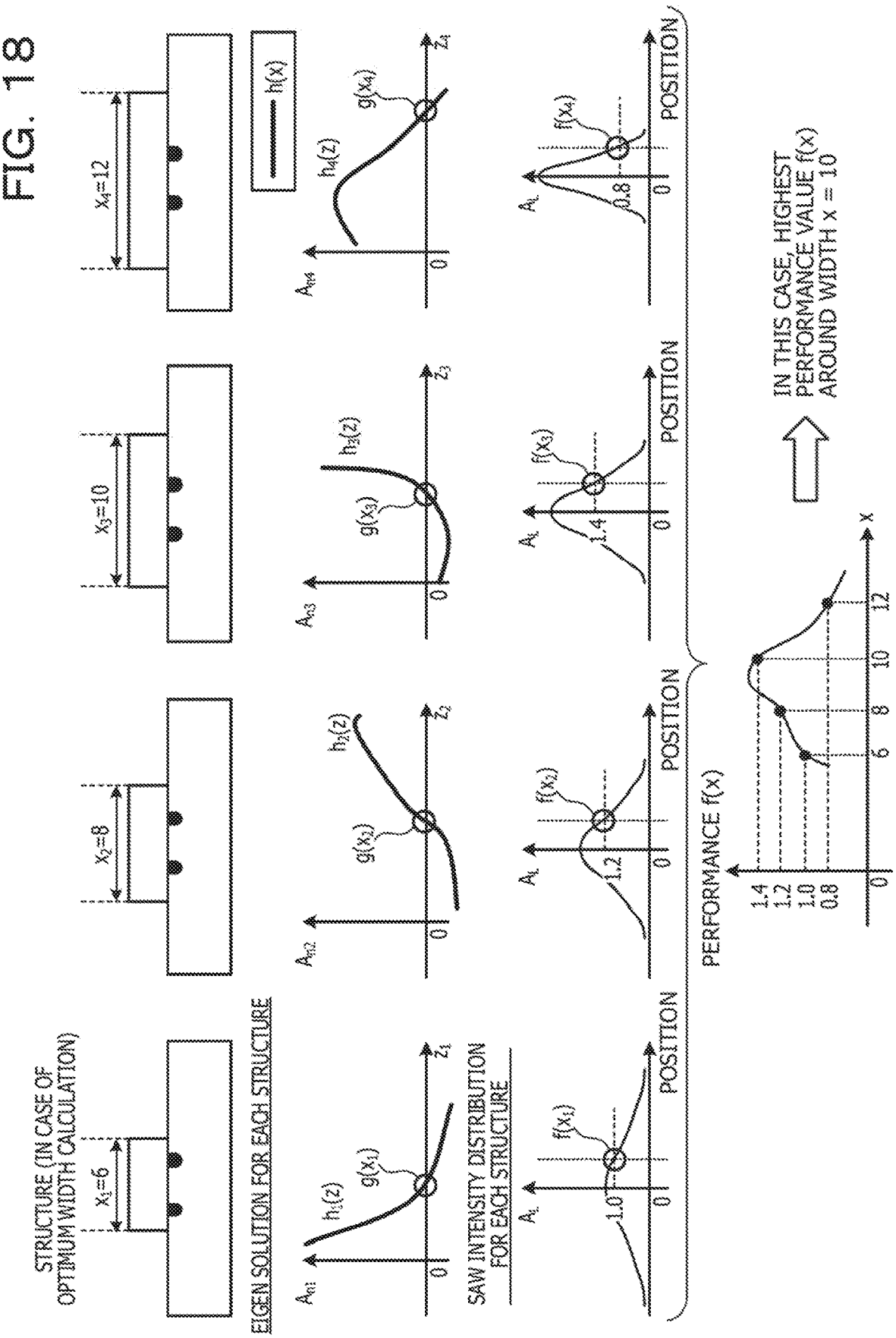
FIG. 18 is a supplementary diagram for description of the structure design with evolutionary computation.

First, a reference example of a flowchart for structure design with evolutionary computation will be described with reference to FIG. 17. FIG. 17 is a diagram illustrating a reference example of a flowchart for structure design with evolutionary computation. The flowchart in FIG. 17 will be described with reference to the supplementary drawing in FIG. 18.

As illustrated in FIG. 17, an arithmetic processing unit obtains structures to be designed as input values $x_{km}$ (S110). k indicates a generation, and m indicates an input value number within the generation. For example, as illustrated in the first row in FIG. 18, in order to calculate an optimum width, input values within a certain generation are "6" as $x_1$, "8" as $x_2$, "10" as $x_3$, and "12" as $x_4$.

The arithmetic processing unit calculates an operating condition inherent to each input value $x_{km}$ (S120). In other words, for example, when $A_1=1$ and $B_1=0$ of the eigen solution condition in Expression (2) are input, a function for acquiring $A_n$ is expressed as h(z). Because $A_n$ is h(z) and because of the condition $A_n=0$, a condition acquired by solving the equation resulting $A_n$, that is, h(z) equal to zero is an eigen solution g(z). Because h(z) depends on the structure, it varies in accordance with the input value $x_{km}$. If the possible range of the eigen solution is 1000 points that z may take, the arithmetic processing unit searches eigen solutions and eigen actions for all of the 1000 points.

The arithmetic processing unit determines eigen solutions and eigen actions (S130). In other words, for example, the point z resulting in h(z) equal to zero is determined as an eigen solution g(z). For example, as illustrated in the second row of FIG. 18, eigen solutions $g(x_1)$, $g(x_2)$, $g(x_3)$, and $g(x_4)$ for the input values of the structures are determined. As illustrated in the third row of FIG. 18, the SAW intensity distributions for the input values of the structures are determined as eigen actions. Each of the SAW intensity distributions is represented by a graph having a position of an optical signaling channel as x axis and an SAW intensity as a y axis. The SAW intensity distribution as an eigen action is determined based on an eigen solution.

The arithmetic processing unit calculates a performance of a target input value (S140). For example, as illustrated in the third row of FIG. 18, the arithmetic processing unit calculates, as a performance value, an SAW intensity corresponding to the position of the optical signaling channel of each of the structures from the SAW intensity distribution for the input value being each of the structures. When the input value is $x_1$, "1.0" is calculated as a performance value $f(x_1)$. When the input value is $x_2$, "1.2" is calculated as a performance value $f(x_2)$. When the input value is $x_3$, "1.4"

is calculated as a performance value f(x$_3$). When the input value is x$_4$, "0.8" is calculated as a performance value f(x$_4$).

The arithmetic processing unit evaluates the performances corresponding to the input values (S150). For example, as illustrated in the fourth row of FIG. 18, the performance value is 1.0 for the input value x$_1$ (=6). For the input value x$_2$ (=8), the performance value is 1.2. For the input value x$_3$ (=10), the performance value is 1.4. For the input value x$_4$ (=12), the performance value is 0.8. Therefore, in this case, the part in which the width indicated by x is around "10" is evaluated as producing the highest performance value f(x).

If the end condition is not satisfied, the arithmetic processing unit selects the input values based on the evaluation results (S160). For example, the arithmetic processing unit keeps the input value x$_3$(=10), the input value x$_1$(=6) and the input value x$_2$(=8) having a high performance value, and removes the input value x$_4$(=12) with the lowest performance value.

The arithmetic processing unit generates input value x$_{k+1m}$ of the next generation (S170). For example, the arithmetic processing unit crossovers the selected input values and changes the crossed input values to generate the input values of the next generation. The arithmetic processing unit evaluates the performances for the input values of the next generation.

If the end condition is satisfied, the arithmetic processing unit selects an optimum input value based on the evaluation result (step S180).

In the processing of the evolutionary computation for selecting such an optimum structure design, the arithmetic processing unit calculates an eigen solution required for acquiring an SAW intensity distribution. In this case, the arithmetic processing unit searches an eigen solution for all points in the possible range of the eigen solution. The arithmetic processing unit therefore requires a large amount of computational complexity for acquiring an eigen solution, which means that the entire amount of computational complexity of evolutionary computation may not be reduced.

Accordingly, an arithmetic processing unit will be described which may reduce the amount of computational complexity of evolutionary computation.

Embodiment 1

[Configuration of Arithmetic Processing Unit]

Figure 1:
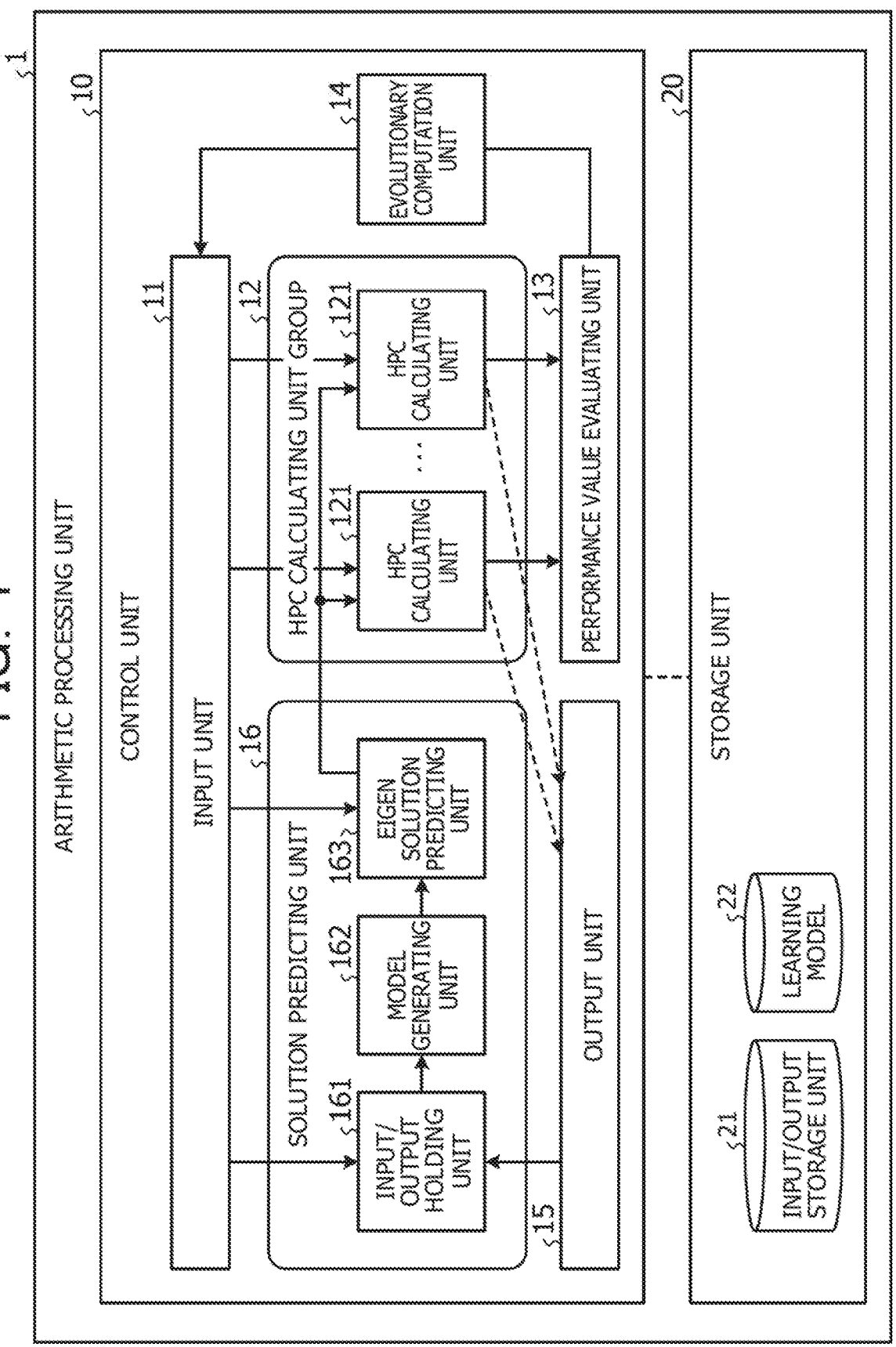
FIG. 1 is a functional block diagram illustrating a configuration of an arithmetic processing unit according to Embodiment 1.

FIG. 1 is a functional block diagram illustrating a configuration of an arithmetic processing unit according to Embodiment 1. In evolutionary computation that searches an input value representing an optimum structure, an arithmetic processing unit 1 illustrated in FIG. 1 predicts a range of an eigen solution for a new second input value based on a first input value in the past and the eigen solution for the input value. The arithmetic processing unit 1 searches an eigen solution for the second input value in the predicted range of the eigen solution. In other words, for example, the inventor focuses on a fact that an input value representing a structure and an eigen solution are correlated and uses a repetition peculiar to evolutionary computation to predict an eigen solution for an input value representing a structure based on an evaluation result in the past and search a part near the predicted value so that the eigen solution for the input value is found. The term "input value" herein refers to a structure to be designed of an optical SAW filter. The structure to be designed has an optical signaling channel and is selected as a structure having an optimum arrangement thereof.

The arithmetic processing unit 1 has a control unit 10 and a storage unit 20.

The control unit 10 is an electronic circuit, such as a central processing unit (CPU). In addition, the control unit 10 has an internal memory for storing programs defining various processing procedures or control data, and executes various processing using the programs and data. The control unit 10 has an input unit 11, a high-performance computing (HPC) calculating unit group 12, a performance value evaluating unit 13, an evolutionary computation unit 14, an output unit 15, and a solution predicting unit 16.

The storage unit 20 is a semiconductor memory device (for example, a random-access memory (RAM) or a flash memory), or a storage device (for example, a hard disk or an optical disk). The storage unit 20 has an input/output storage unit 21 and a learning model 22.

The input/output storage unit 21 stores an input value and an output value (performance value) in the past and an eigen solution in association. The input/output storage unit 21 is stored by an input/output holding unit 161, which will be described below.

The learning model 22 is a resulting model of learning for acquiring a range of an eigen solution corresponding to a new input value by using an input value in the past and an eigen solution corresponding to the input value. The learning model 22 learns by a method using a neural network (NN). The learning model 22 is generated by a model generating unit 162, which will be described below.

The input unit 11 outputs a plurality of input values to be designed and to be used for generating the learning model 22 to an HPC calculating unit 121, which will be described below, and the input/output holding unit 161, which will be described below. The input unit 11 outputs a plurality of input values to be designed for predicting an eigen solution by using the learning model 22 to an eigen solution predicting unit 163, which will be described below.

The HPC calculating unit group 12 has a plurality of HPC calculating units 121. Hereinafter, one HPC calculating unit 121 will be described.

The HPC calculating unit 121 receives an input value to be designed of a predetermined generation and acquires an eigen solution satisfying an eigen solution condition for the input value. In other words, for example, the HPC calculating unit 121 searches an eigen solution satisfying an eigen solution condition (Expression (2)) for an input value from an entire possible range of the eigen solution. Hereinafter, the search for an eigen solution satisfying an eigen solution condition from an entire range will be called "entire range search". For example, representing a function for acquiring A$_n$ by h(z) when A$_1$=1 and B$_1$=0 in the eigen solution condition of Expression (2) are input, the HPC calculating unit 121 solves an equation resulting in A$_n$ or h(z) equal to zero because of a condition of A$_n$=0. The condition for solving the equation resulting in zero is an eigen solution g(z). The possible range of the eigen solution is all possible points of z. Therefore, the HPC calculating unit 121 searches an eigen solution resulting in h(z) equal to zero at all possible points of z. The HPC calculating unit 121 outputs the eigen solution for the input value, which is searched by the entire range search, to an output unit 15, which will be described below.

In addition, the HPC calculating unit 121 calculates an SAW intensity distribution (eigen action) as an objective function based on the eigen solution. For example, the HPC calculating unit 121 calculates an SAW intensity distribution corresponding to the eigen solution based on Expression (1). The HPC calculating unit 121 substitutes the eigen solution for Neff in Expression (1) to calculate an SAW intensity distribution corresponding to the eigen solution. The HPC calculating unit 121 calculates an SAW intensity corresponding to an input value as a performance value by using the SAW intensity distribution for the input value. The HPC calculating unit 121 outputs the performance value for the input value to the output unit 15, which will be described below.

The performance value evaluating unit 13 calculates a performance value corresponding to each input value for each input value. The performance value evaluating unit 13 evaluates the performance of each input value based on the performance value for each input value. The performance value evaluating unit 13 finally selects an optimum input value based on results of performance evaluations on the input values.

The evolutionary computation unit 14 selects input values to be kept from a plurality of input values based on the evaluation results of the performances of input values. The evolutionary computation unit 14 crossover the selected input values and changes the crossed input value to generate the input values of the next generation. The evolutionary computation unit 14 outputs the input values of the next generation to the input unit 11.

The output unit 15 outputs the eigen solutions and performance values for input values, which are output from the HPC calculating units 121 and searched by the entire range search" to the input/output holding unit 161, which will be described below.

The solution predicting unit 16 has the input/output holding unit 161, a model generating unit 162, and an eigen solution predicting unit 163.

The input/output holding unit 161 holds the eigen solutions and performance values for input values, which are searched by the entire range search, in the input/output storage unit 21.

The model generating unit 162 generates the learning model 22 that predicts the range in which the eigen solutions satisfying an eigen solution condition for input values exist based on eigen solutions for the input values, which are searched by the entire range search. For example, the model generating unit 162 causes a neural network (NN) to learn input values and eigen solutions, which are stored in the input/output storage unit 21 and searched by the entire range search, and generates the learning model 22 that predicts the range of the eigen solution for an input value.

Figure 2:
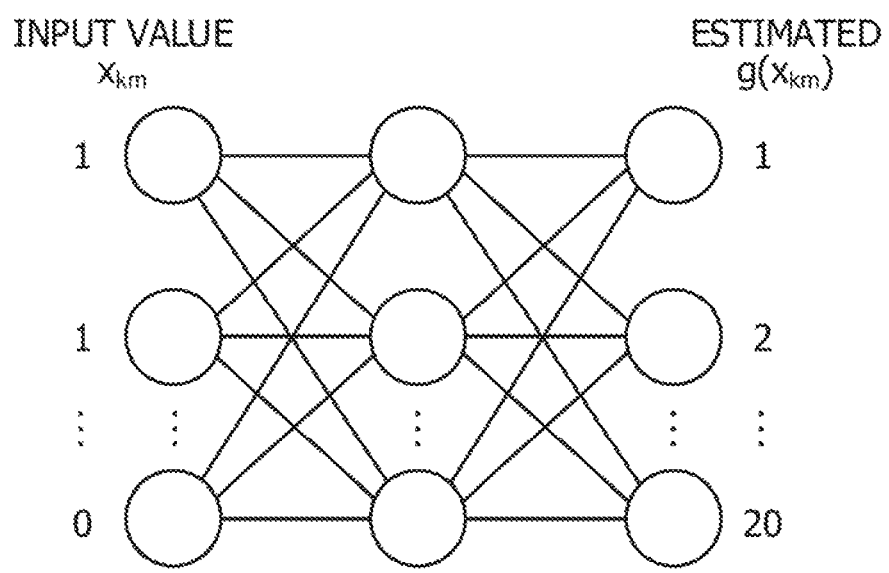
FIG. 2 is a diagram illustrating model generation according to Embodiment 1.

The model generation by the model generating unit 162 will be described with reference to FIG. 2. FIG. 2 is a diagram illustrating the model generation according to Embodiment 1. As illustrated in FIG. 2, the model generating unit 162 causes an NN to learn input values $x_{km}$ and eigen solutions $g(x_{km})$ and thus generates the learning model 22 that predicts an estimation $g(x_{km})$ for an input value. The term "estimation $g(x_{km})$" refers to a range of an eigen solution. k indicates a generation, and m indicates an input value number within the generation.

Referring back to FIG. 1, the eigen solution predicting unit 163 uses the learning model 22 to predict the range (solution candidate range) in which the eigen solution for an input value exists.

The eigen solution predicting unit 163 searches an eigen solution for an input value, which satisfies the eigen solution condition for the input value, within the predicted eigen solution range. Hereinafter, the search for an eigen solution satisfying an eigen solution condition from an eigen solution range will be called "partial range search".

For example, representing a function for acquiring $A_n$ by $h(z)$ when $A_1=1$ and $B_1=0$ in the eigen solution condition of Expression (2) are input, the eigen solution predicting unit 163 solves an equation resulting in $A_n$ or $h(z)$ equal to zero because of a condition of $A_n=0$. The condition for solving the equation resulting in zero is an eigen solution $g(z)$. The range of z for solving the equation resulting in zero is the predicted eigen solution range (partial range). The eigen solution predicting unit 163 searches an eigen solution at points within the predicted eigen solution range (partial range). In other words, for example, the eigen solution predicting unit 163 substitutes values of z within the eigen solution range sequentially for the equation $h(z)$ and predicts the value of z resulting in zero as an eigen solution.

If the eigen solution prediction succeeds, the eigen solution predicting unit 163 outputs the eigen solution along with the input value to the HPC calculating unit 121. This is for causing the HPC calculating unit 121 to calculate an SAW intensity distribution (eigen action) of the eigen solution for the input value and to calculate the performance value for the input value. On the other hand, if the eigen solution prediction fails, the eigen solution predicting unit 163 outputs the input value for the eigen solution resulting from the prediction failure to the HPC calculating unit 121. This is for causing the HPC calculating unit 121 to acquire an eigen solution for the input value by the entire range search.

[Description of Eigen Solution Prediction]

Figure 3:
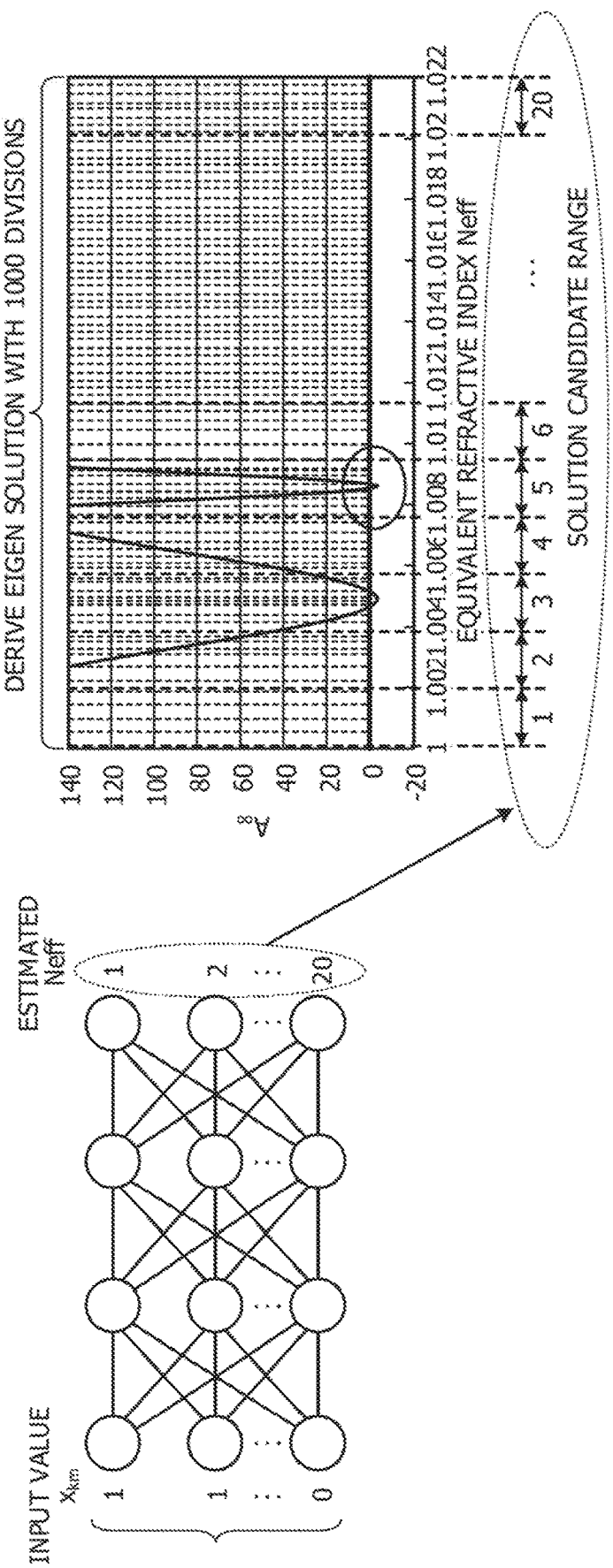
FIG. 3 is a diagram illustrating eigen solution prediction according to Embodiment 1.

The eigen solution prediction by the eigen solution predicting unit 163 will be described with reference to FIG. 3. FIG. 3 is a diagram illustrating eigen solution prediction according to Embodiment 1. In FIG. 3, the solution candidate range is divided into 20 ranges for 500 points acquired by dividing 1000 points by 20.

First, by using the learning model 22 illustrated on the left side of FIG. 3, the eigen solution predicting unit 163 predicts a solution candidate range for input values $x_{km}$.

Next, as illustrated on the right side of FIG. 3, the eigen solution predicting unit 163 searches an eigen solution for an input value, which satisfies the eigen solution condition for the input value, within the predicted solution candidate range. It is assumed here that the predicted solution candidate range is "5". Within the range indicated by the solution candidate range "5", the eigen solution predicting unit 163 solves an equation in which the function $h(z)$ for acquiring $A_n$ when input of $A_1=1$ and $B_1=0$ of the eigen solution condition of Expression (2) results in zero because of a condition of $A_n=0$. In other words, for example, the eigen solution predicting unit 163 substitutes values of z within the range indicated by the solution candidate range "5" for the equation $h(z)$. If the function $h(z)$ results in zero with one of z values within the solution candidate range, that is, if the eigen solution prediction succeeds, the eigen solution predicting unit 163 predicts the z value with which the function $h(z)$ results in zero as an eigen solution. Thus, compared with the case of the entire range search that searches all points with a possible range of a solution, the eigen solution predicting unit 163 may search only in the 1/20 range, resulting in reduction of the amount of computational complexity to 1/20 and increases the processing speed.

If the function $h(z)$ does not result in zero with z values within the solution candidate range, that is, if the eigen solution prediction fails, the eigen solution predicting unit 163 may cause the HPC calculating unit 121 to acquire an eigen solution by the entire range search.

[Flowchart of Model Generation]

Figure 4:
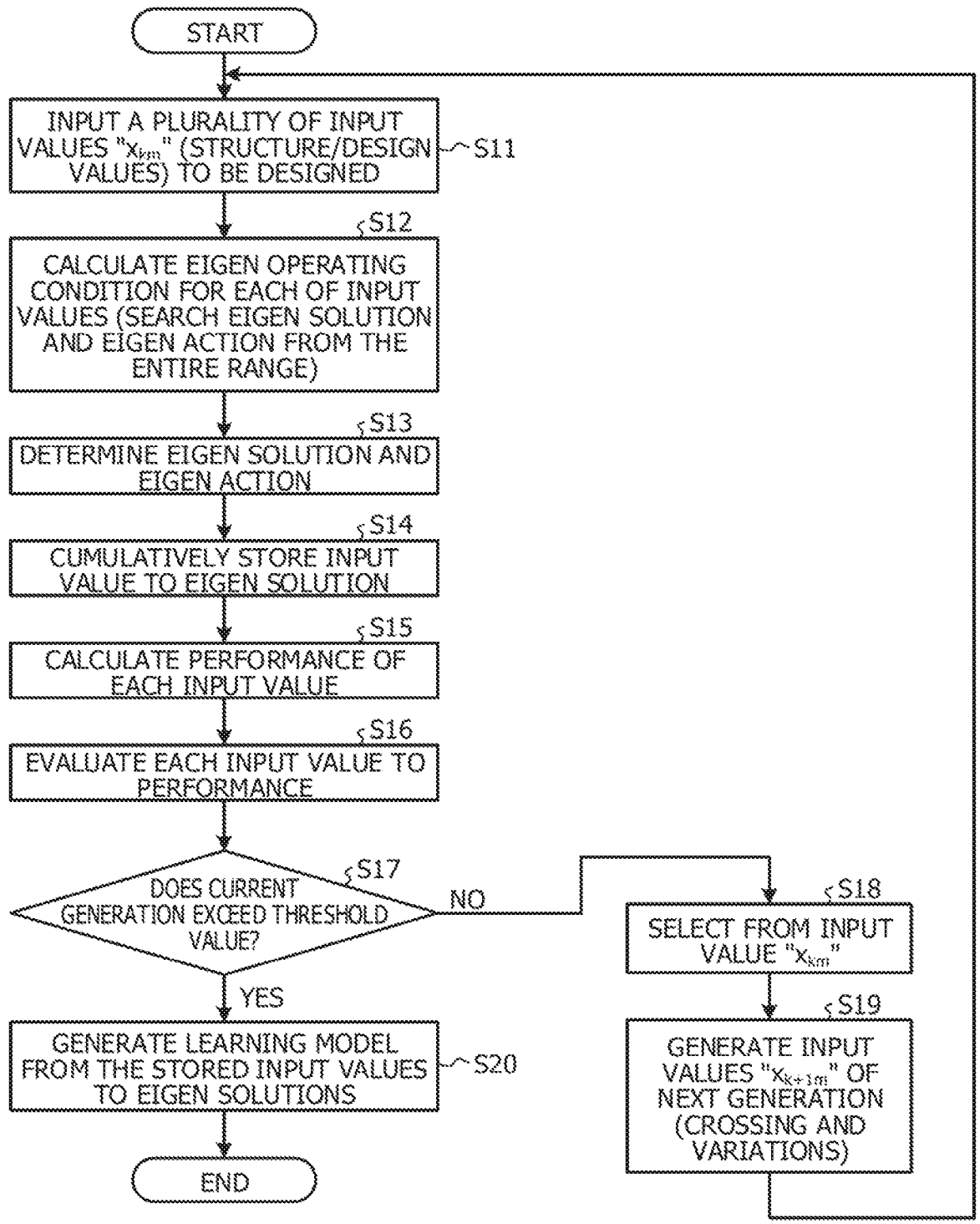
FIG. 4 is a diagram illustrating an example of a flowchart for the model generation according to Embodiment 1.

FIG. 4 is a diagram illustrating an example of a flowchart for the model generation according to Embodiment 1. The initial value of the generation k is assumed to be "1".

As illustrated in FIG. 4, the input unit 11 inputs a plurality of input values "$x_{km}$" to be designed (structures/design values) (step S11).

The HPC calculating unit 121 calculates an eigen action condition for each of the input values "$x_{km}$" (step S12). For example, when $A_1=1$ and $B_1=0$ of the eigen solution condition in Expression (2) are input, the HPC calculating unit 121 calculates the function h(z) for acquiring $A_n$ for each of the input values. The HPC calculating unit 121 solves the equation resulting in $A_n$ or h(z) equal to zero with respect to all possible points of z because of the condition of $A_n=0$ of the eigen solution condition in Expression (2) for each of the input values.

The HPC calculating unit 121 determines the eigen solution and the eigen action for each of the input values (step S13). For example, the HPC calculating unit 121 determines, as an eigen solution, the value of z with which the equation h(z) is solved to zero for each of the input values. Based on Expression (1), the HPC calculating unit 121 calculates, as an eigen action, an SAW intensity distribution corresponding to the determined eigen solution. The HPC calculating unit 121 substitutes the eigen solution for Neff in Expression (1) to calculate an SAW intensity distribution corresponding to the eigen solution.

The input/output holding unit 161 cumulatively stores the eigen solutions for the input values in the input/output storage unit 21 (step S14).

The performance value evaluating unit 13 calculates the performances of the input values (step S15). For example, the performance value evaluating unit 13 calculates, as a performance value, an SAW intensity corresponding to the position of the optical signaling channel of each of the structures indicated by the input values from the SAW intensity distribution for the input values. The performance value evaluating unit 13 evaluates the performances of the input values based on the performance values of the input values (step S16).

The performance value evaluating unit 13 determines whether the current generation exceeds a threshold value or not (step S17). If it is determined that the current generation does not exceed the threshold value (No in step S17), the evolutionary computation unit 14 selects input values from the current input values "$x_{km}$" based on the evaluation results (step S18).

The evolutionary computation unit 14 generates input values "$x_{k+1m}$" of the next generation (step S19). For example, the evolutionary computation unit 14 crossovers the selected input values and changes the crossed input value to generate the input values of the next generation. The evolutionary computation unit 14 moves to step S11 for processing on the next generation.

On the other hand, if it is determined that the current generation exceeds the threshold value (Yes in step S17), the model generating unit 162 generates the learning model 22 that predicts the range in which eigen solutions for the input values exist from the eigen solutions for the stored input values (step S20). The model generation processing ends.

[Flowchart for Evolutionary Computation]

Figure 5:
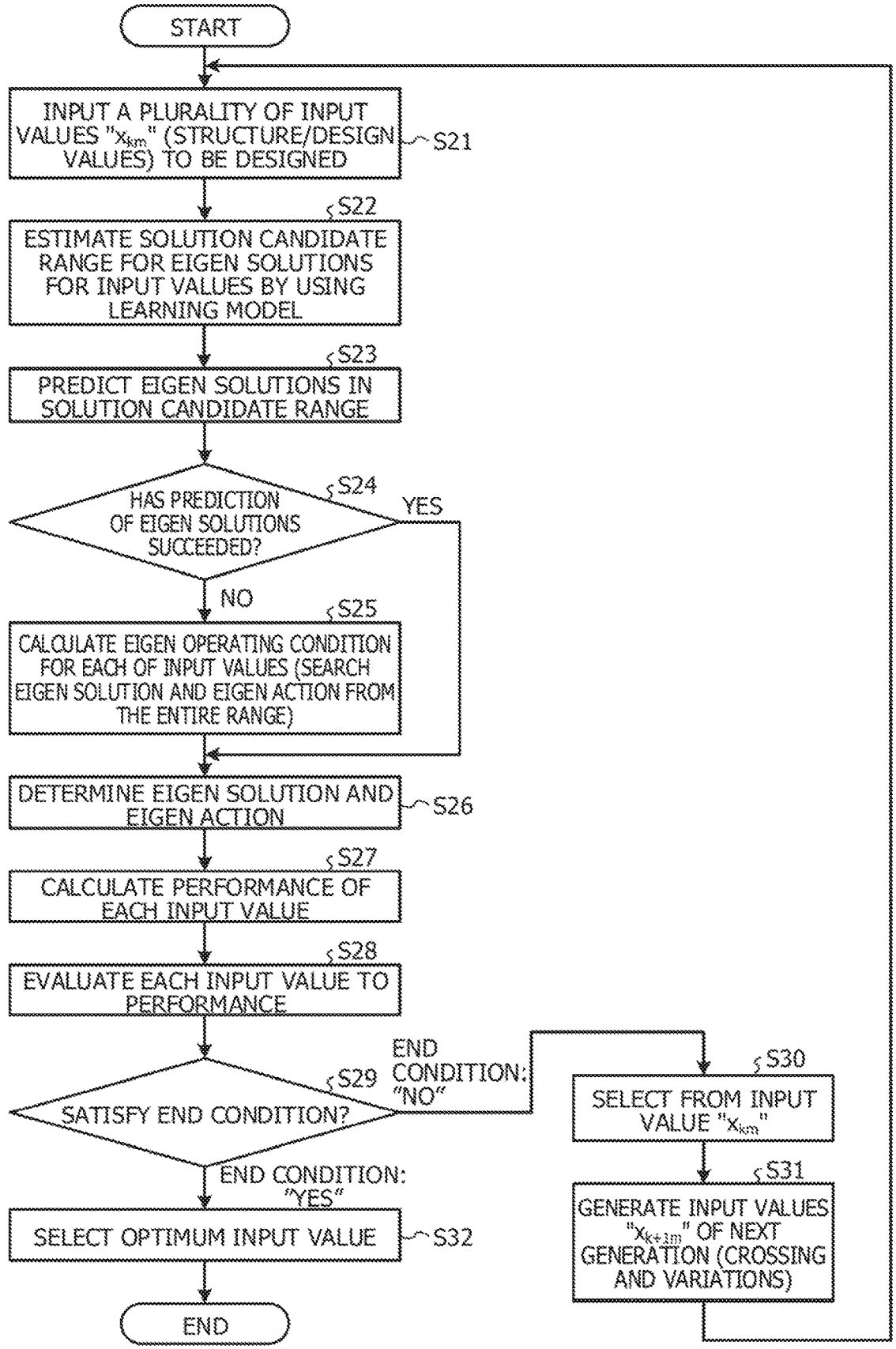
FIG. 5 is a diagram illustrating an example of a flowchart for structure design with evolutionary computation according to Embodiment 1.

FIG. 5 is a diagram illustrating an example of a flowchart for evolutionary computation according to Embodiment 1. The initial value of the generation k is assumed to be the threshold value used for the model generation+1.

As illustrated in FIG. 5, the input unit 11 inputs a plurality of input values "$x_{km}$" to be designed (structures/design values) (step S21).

By using the learning model 22, the eigen solution predicting unit 163 estimates a solution candidate range for eigen solutions for input values (step S22). The eigen solution predicting unit 163 predicts an eigen solution in the solution candidate range (step S23). For example, when $A_1=1$ and $B_1=0$ of the eigen solution condition in Expression (2) are input, the eigen solution predicting unit 163 calculates the function h(z) for acquiring $A_n$ for each of the input values. The eigen solution predicting unit 163 solves the equation resulting in $A_n$ or h(z) equal to zero with respect to points of z in the estimated solution candidate range because of the condition of $A_n=0$ of the eigen solution condition in Expression (2) for each of the input values to predict an eigen solution. In other words, for example, the eigen solution predicting unit 163 substitutes values of z within the eigen solution range sequentially for the equation h(z) and predicts the value of z resulting in zero as an eigen solution.

The eigen solution predicting unit 163 determines whether the eigen solution prediction has succeeded or not (step S24). If it is determined that the eigen solution prediction has succeeded (Yes in step S24), the eigen solution predicting unit 163 moves to step S26.

On the other hand, if it is determined that the eigen solution prediction has not succeeded (No in step S24), the HPC calculating unit 121 calculates eigen action conditions for the input values "$x_{km}$" (step S25). For example, when $A_1=1$ and $B_1=0$ of the eigen solution condition in Expression (2) are input, the HPC calculating unit 121 calculates the function h(z) for acquiring $A_n$ for each of the input values. The HPC calculating unit 121 solves the equation resulting in $A_n$ or h(z) equal to zero with respect to all possible points of z because of the condition of $A_n=0$ of the eigen solution condition in Expression (2) for each of the input values to predict an eigen solution. The HPC calculating unit 121 moves to step S26.

The HPC calculating unit 121 determines the eigen solution and the eigen action for each of the input values (step S26). For example, the HPC calculating unit 121 determines, as an eigen solution, the value of z with which the equation h(z) is solved to zero for each of the input values. Based on Expression (1), the HPC calculating unit 121 calculates, as an eigen action, an SAW intensity distribution corresponding to the determined eigen solution. The HPC calculating unit 121 substitutes the eigen solution for Neff in Expression (1) to calculate an SAW intensity distribution corresponding to the eigen solution.

The performance value evaluating unit 13 calculates the performances of the input values (step S27). For example, the performance value evaluating unit 13 calculates, as a performance value, an SAW intensity corresponding to the position of the optical signaling channel of each of the structures indicated by the input values from the SAW intensity distribution for the input values. The performance value evaluating unit 13 evaluates the performances of the input values based on the performance values of the input values (step S28).

The performance value evaluating unit 13 determines whether an end condition is satisfied or not (step S29). If it is determined that the end condition is not satisfied (No in step S29), the evolutionary computation unit 14 selects input values from the current input values "$x_{km}$" based on the evaluation results (step S30).

The evolutionary computation unit 14 generates input values "$x_{k+1m}$" of the next generation (step S31). For example, the evolutionary computation unit 14 crossovers the selected input values and changes the crossed input value to generate the input values of the next generation. The evolutionary computation unit 14 moves to step S21 for processing on the next generation.

On the other hand, if it is determined that the end condition is satisfied (Yes in step S29), the performance value evaluating unit 13 selects an optimum input value based on the results of the performance evaluations for the input values (step S32). The evolutionary computation processing ends.

[Hit Rate of Solution Candidate Range when Learning Model is Used]

Figure 6:
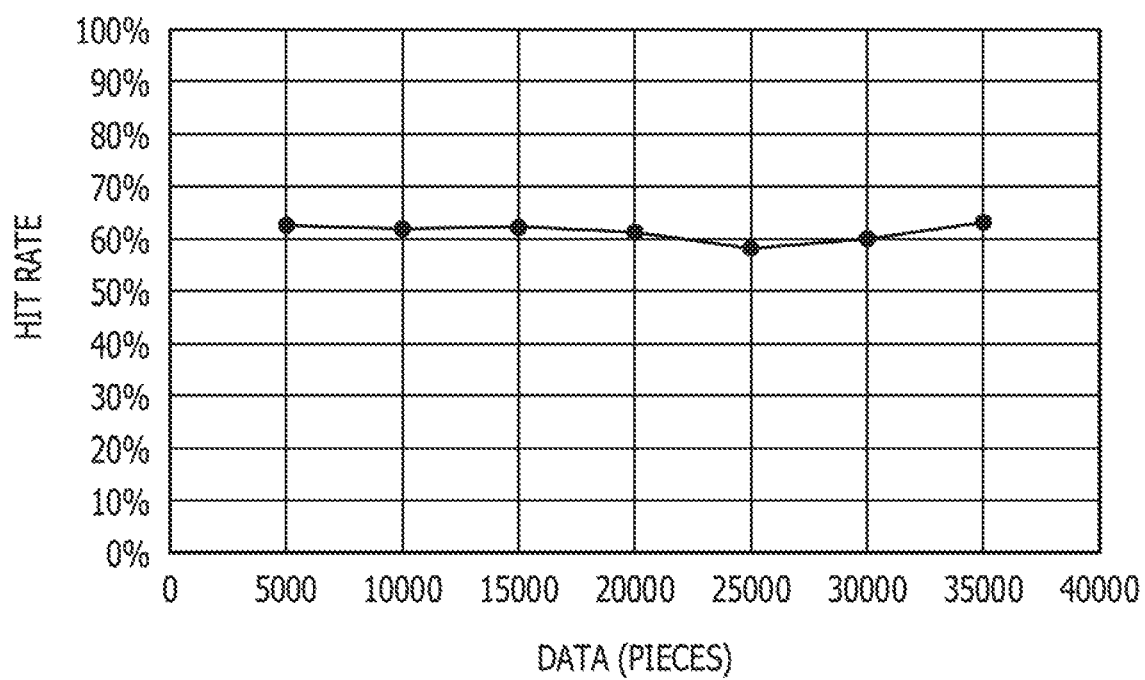
FIG. 6 is a diagram illustrating a hit rate of a solution candidate range in a case where a learning model according to Embodiment 1 is used.

A hit rate of a solution candidate range when the learning model 22 according to Embodiment 1 is used will be described with reference to FIG. 6. FIG. 6 is a diagram illustrating a hit rate of a solution candidate range in a case where the learning model according to Embodiment 1 is used. FIG. 6 illustrates an example of evolutionary computation in which there are 200 input values for one generation and 40000 input values of 200 generations are to be evaluated. The learning model 22 is a four-layered NN, and the solution candidate range is divided into 20 ranges.

In this situation, the model generating unit 162 learned 5000 (200 input values×25 generations) data pieces of the initial first to 25th generations to generate the learning model 22. For the 26th and subsequent generations of 5001st data piece, the eigen solution predicting unit 163 predicted solution candidate ranges for input values by using the learning model 22, performed the partial range search in the predicted solution candidate range and predicted eigen solutions.

As illustrated in FIG. 6, the probability of the success of the prediction of an eigen solution was a hit rate of 60% or higher in the data pieces (input values) of the 26th and subsequent generations of 5001st and subsequent data. For example, with 5001 to 10000 data pieces (input values), the hit rate exceeds 60%. With 30000 to 35000 data (input values), the hit rate exceeds 60%.

This means that the amount of computational complexity of the 60% data of the data of the 26th and subsequent generations of 5001st and subsequent data pieces is 1/20. Then, when the entire range search is performed on the remaining 40% data, the amount of characteristic computational complexity for input values per one entire range search is 43% (0.43=0.4×1+0.6×1/20). In addition, although the entire range search is even performed in the 5000 calculations of 40000 calculations, the total amount of computational complexity is 50% (0.5=5000/40000×1+35000/40000×0.43). In other words, for example, the arithmetic processing unit 1 may reduce the amount of computational complexity of the evolutionary computation by using the solution candidate range of the learning model 22 according to Embodiment 1.

[Effects of Embodiment 1]

According to Embodiment 1, the arithmetic processing unit 1 calculates an objective function based on eigen solutions for input values and repeatedly calculates the objective function so that the following processing is performed in evolutionary computation that searches an optimum value of the input values. The arithmetic processing unit 1 predicts a range of an eigen solution for the second input value, which satisfies a predetermined eigen solution condition, based on a first eigen solution for the first input value. The arithmetic processing unit 1 searches the second eigen solution for the second input, which satisfies the eigen solution condition, in the predicted range of the eigen solution. With this configuration, the arithmetic processing unit 1 predicts an eigen solution by using the range of the eigen solution for an input value satisfying the eigen solution condition so that the entire amount of computational complexity of the evolutionary computation may be reduced.

According to Embodiment 1, the arithmetic processing unit 1 calculates a first eigen solution for a first input value based on a predetermined eigen solution condition. The arithmetic processing unit 1 generates the learning model 22 that predicts a range of an eigen solution satisfying the eigen solution condition based on the first input value and the first eigen solution being a result of the calculation. With this configuration, the arithmetic processing unit 1 predicts the range of an eigen solution by using the learning model 22 so that the amount of computational complexity for calculating an eigen solution may be reduced. As a result, the arithmetic processing unit 1 may reduce the entire amount of computational complexity of evolutionary computation.

According to Embodiment 1, the arithmetic processing unit 1 calculates an objective function (SAW intensity distribution) based on the second eigen solution for the second input value. The arithmetic processing unit 1 evaluates a performance for the second input value based on the calculated objective function. The arithmetic processing unit 1 generates a new second input value from the second input value based on the evaluated performance value. The arithmetic processing unit 1 repeats, on the new second input value, the processing of predicting the range of the eigen solution, the processing of searching the eigen solution, the processing of calculating an objective function, the processing of evaluating the performance for the input value and the processing of generating a new input value. With this configuration, the arithmetic processing unit 1 may reduce the entire amount of computational complexity of evolutionary computation.

Embodiment 2

According to Embodiment 1, the arithmetic processing unit 1 generates the learning model 22 that predicts in which range an eigen solution for an input value exists based on eigen solutions for input values from the first generation to the mth generation searched by the entire range search. The arithmetic processing unit 1 predicts a solution candidate range of the eigen solution for the input value from input values of the (m+1)th generation by using the generated learning model 22 and performs partial range search that searches the eigen solution from the solution candidate range. However, the arithmetic processing unit 1 is not limited thereto but may update the learning model 22 in accordance with the generation on which partial range search is to be performed. For example, the arithmetic processing unit 1 updates the learning model 22 such that the learning model uses several generations immediately before the generation on which partial range search is to be performed. The learning model 22 is updated in accordance with the generation because, in evolutionary computation, input values of each of the generations are shifted in accordance with evolutions.

Accordingly, in Embodiment 2, the arithmetic processing unit 1 updates the learning model 22 in accordance with the generation on which partial range search is to be performed.

[Configuration of Arithmetic Processing Unit]

Figure 7:
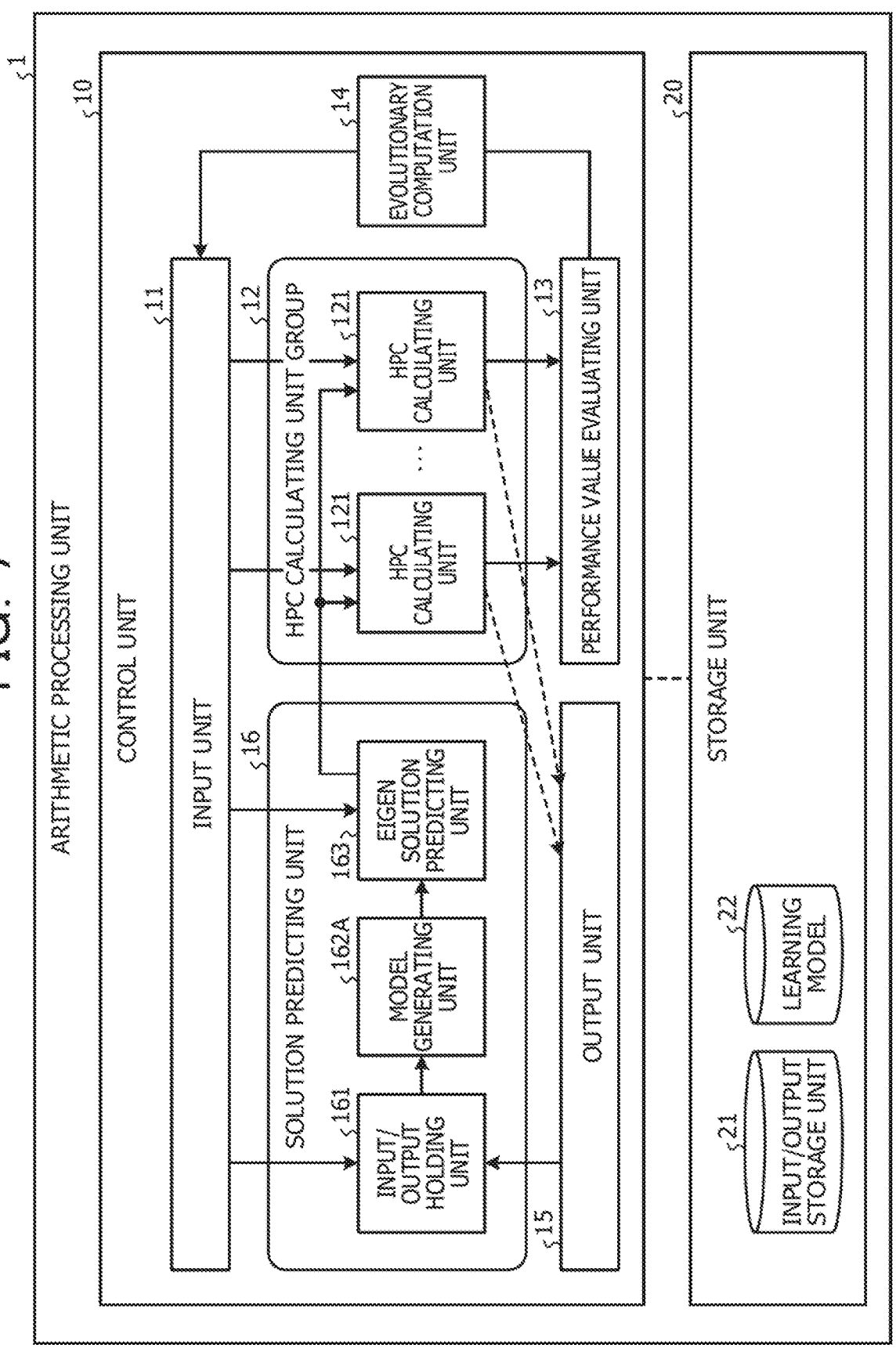
FIG. 7 is a functional block diagram illustrating a configuration of an arithmetic processing unit according to Embodiment 2.

FIG. 7 is a functional block diagram illustrating a configuration of an arithmetic processing unit according to Embodiment 2. Elements of the arithmetic processing unit of FIG. 7 are designated with the same reference numerals as in the arithmetic processing unit 1 of FIG. 1, and the discussion of the identical elements and operation thereof is omitted herein. Embodiment 1 and Embodiment 2 are different in that the model generating unit 162 is replaced by a model generating unit 162A.

The model generating unit 162A updates the learning model 22 for each generation in which an eigen solution is predicted. For example, the model generating unit 162A generates the learning model 22 that predicts in which range an eigen solution satisfying an eigen solution condition for an input value exists by using input values and eigen solutions of several generations immediately before each generation in which an eigen solution is to be predicted. The model generating unit 162A updates the learning model 22 for each generation in which an eigen solution is to be predicted.

Figure 8:
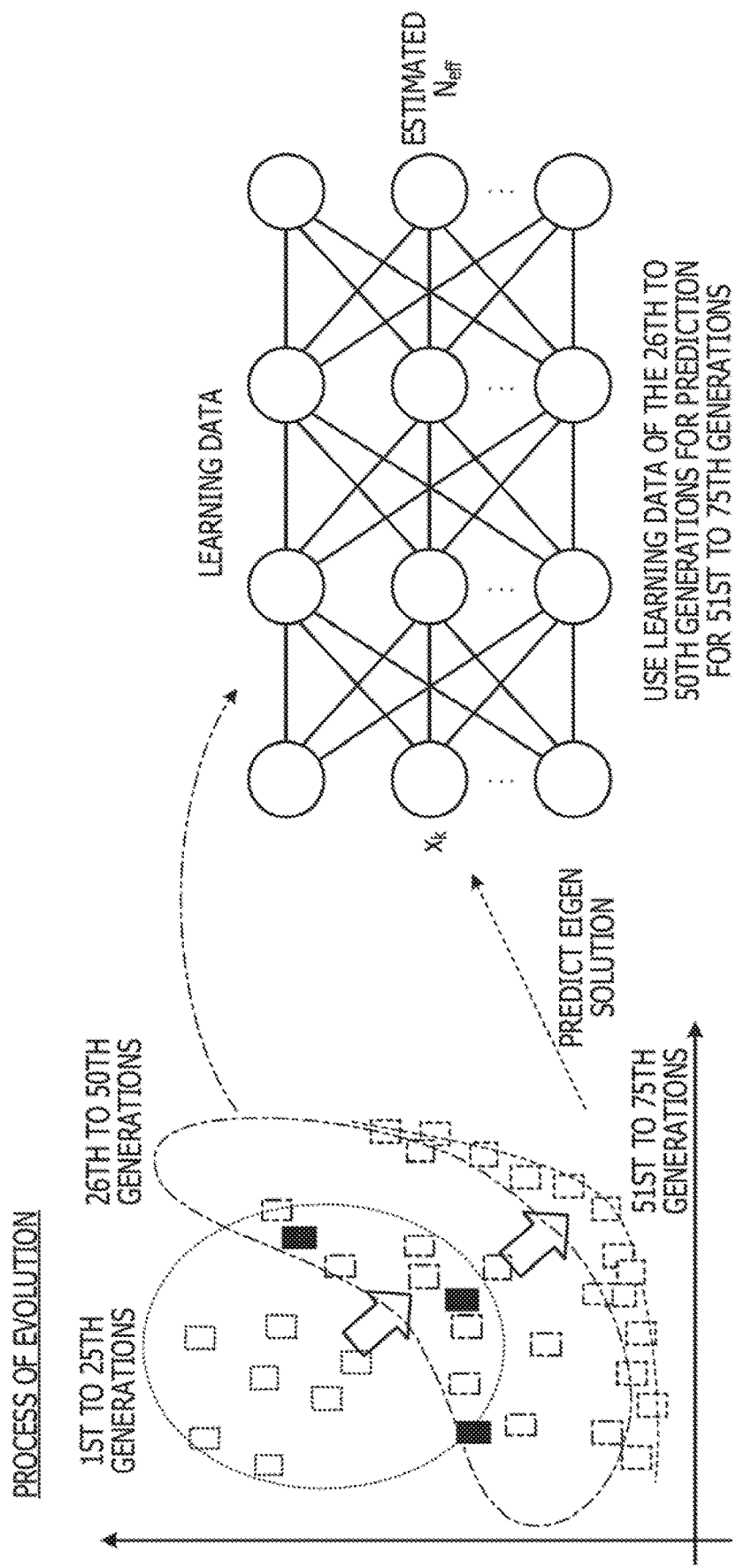
FIG. 8 is a diagram illustrating model generation according to Embodiment 2.

The model generation according to Embodiment 2 will be described with reference to FIG. 8. FIG. 8 is a diagram illustrating the model generation according to Embodiment 2. As illustrated in FIG. 8, input values are shifted in process of evolution in evolutionary computation. While input values exist at the upper left part in the first to 25th generations, the input values are shifted to the lower right part with the progress of the generations such as the 26th to 50th generations and the 51st to 75th generations.

Accordingly, the model generating unit 162A generates and updates the learning model 22 that predicts in which range an eigen solution satisfying an eigen solution condition for an input value exists by using input values of several generations immediately before each generation in which an eigen solution is to be predicted. In order to predict eigen solutions in the 51st to 75th generations, the learning model 22 is generated and updated by using input values of the 26th to 50th generation as learning data. In order to predict eigen solutions in the 26th to 50th generations, the learning model 22 is generated and updated by using input values of the 1st to 25th generation as learning data.

[Hit Rate of Solution Candidate Range when Learning Model is Used]

Figure 9:
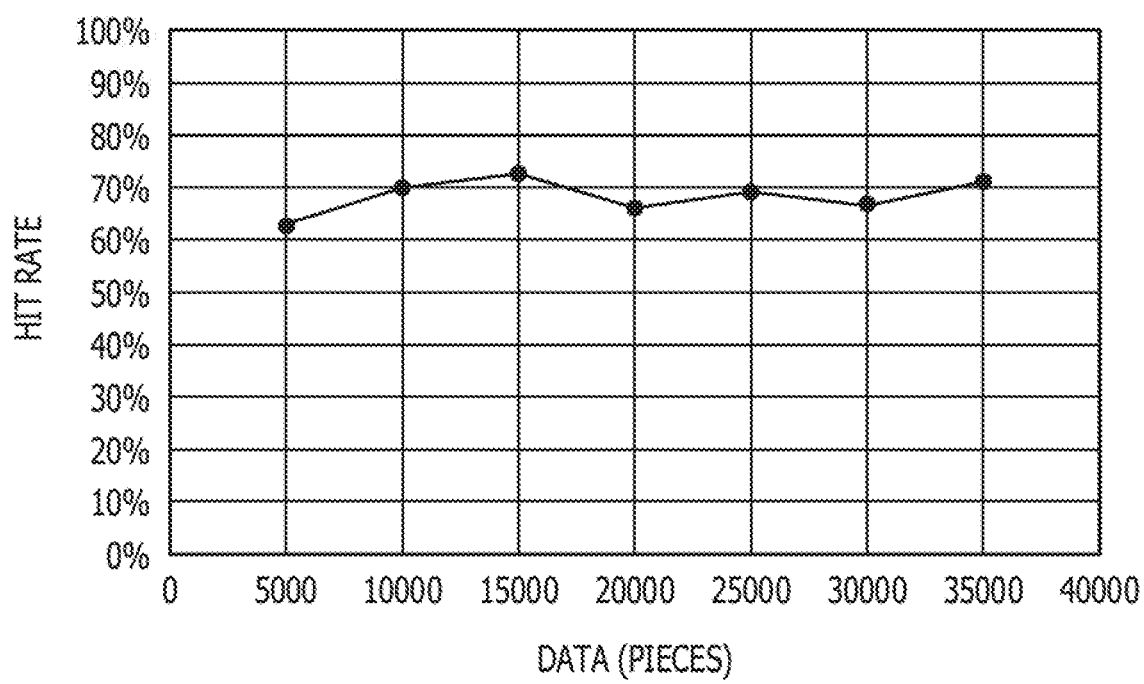
FIG. 9 is a diagram illustrating a hit rate of a solution candidate range in a case where a learning model according to Embodiment 2 is used.

A hit rate of a solution candidate range when the learning model 22 according to Embodiment 2 is used will be described with reference to FIG. 9. FIG. 9 is a diagram illustrating a hit rate of a solution candidate range in a case where the learning model according to Embodiment 2 is used. Like FIG. 6, FIG. 9 illustrates an example of evolutionary computation in which there are 200 input values for one generation and 40000 input values for 200 generations are to be evaluated. The learning model 22 is a four-layered NN, and the solution candidate range is divided into 20 ranges.

In this situation, the model generating unit 162A generates the learning model 22 for eigen solution prediction of the 26th generation by using input values of the 1st to 25th generations as learning data. The model generating unit 162A generates the learning model 22 for eigen solution prediction of the 27th generation by using input values of the 2nd to 26th generations as learning data. After that, the model generating unit 162A continuously updates the learning model 22 to be the latest data reference at all times for each generation.

As illustrated in FIG. 9, the probability of the success of the prediction of an eigen solution was a hit rate of around 70% in the data (input values) of the 26th and subsequent generations of 5001st and subsequent data pieces. For example, with 5001 to 10000 data pieces (input values), the hit rate is 70%. With 30000 to 35000 data pieces (input values), the hit rate is 70%.

Then, while the amount of computational complexity due to the continuation of learning increases, the amount of computational complexity of the 70% data of the data of the 26th and subsequent generations of 5001st and subsequent data pieces is 1/20. Then, when the entire range search is performed on the remaining 30% data, the amount of characteristic computational complexity for input values per one entire range search is 33.5% (0.335=0.3×1+0.7×1/20). In other words, for example, the arithmetic processing unit 1 may further reduce the amount of computational complexity of the evolutionary computation by using the solution candidate range of the learning model 22 according to Embodiment 2.

[Effects of Embodiment 2]

According to Embodiment 2, the arithmetic processing unit 1 generates and updates the learning model 22 based on the first inputs and the first eigen solutions of a plurality of generations before a predetermined generation in a case where the second input is an input of the predetermined generation. With this configuration, the arithmetic processing unit 1 may predict the range of an eigen solution with high precision by using the learning model 22 depending on the generation so that the amount of computational complexity of evolutionary computation may be reduced.

Embodiment 3

According to Embodiment 1, the arithmetic processing unit 1 generates the learning model 22 that predicts in which range an eigen solution for an input value exists based on eigen solutions for input values from the first generation to the mth generation searched by the entire range search. The arithmetic processing unit 1 predicts a solution candidate range of the eigen solution for the input value from input values of the (m+1)th generation by using the generated learning model 22 and performs partial range search that searches the eigen solution from the solution candidate range. However, the arithmetic processing unit 1 is not limited thereto but stores eigen solutions for input values from the 1st to the mth generations, which are searched by the entire range search, in an eigen solution information table 23. The arithmetic processing unit 1 may predict an eigen solution for an input value by using the generated eigen solution information table 23 from the input values of the (m+1)th generation.

According to Embodiment 3, the arithmetic processing unit 1 predicts an eigen solution for a new input value by using the eigen solution information table 23 that stores eigen solutions for input values.

[Configuration of Arithmetic Processing Unit]

Figure 10:
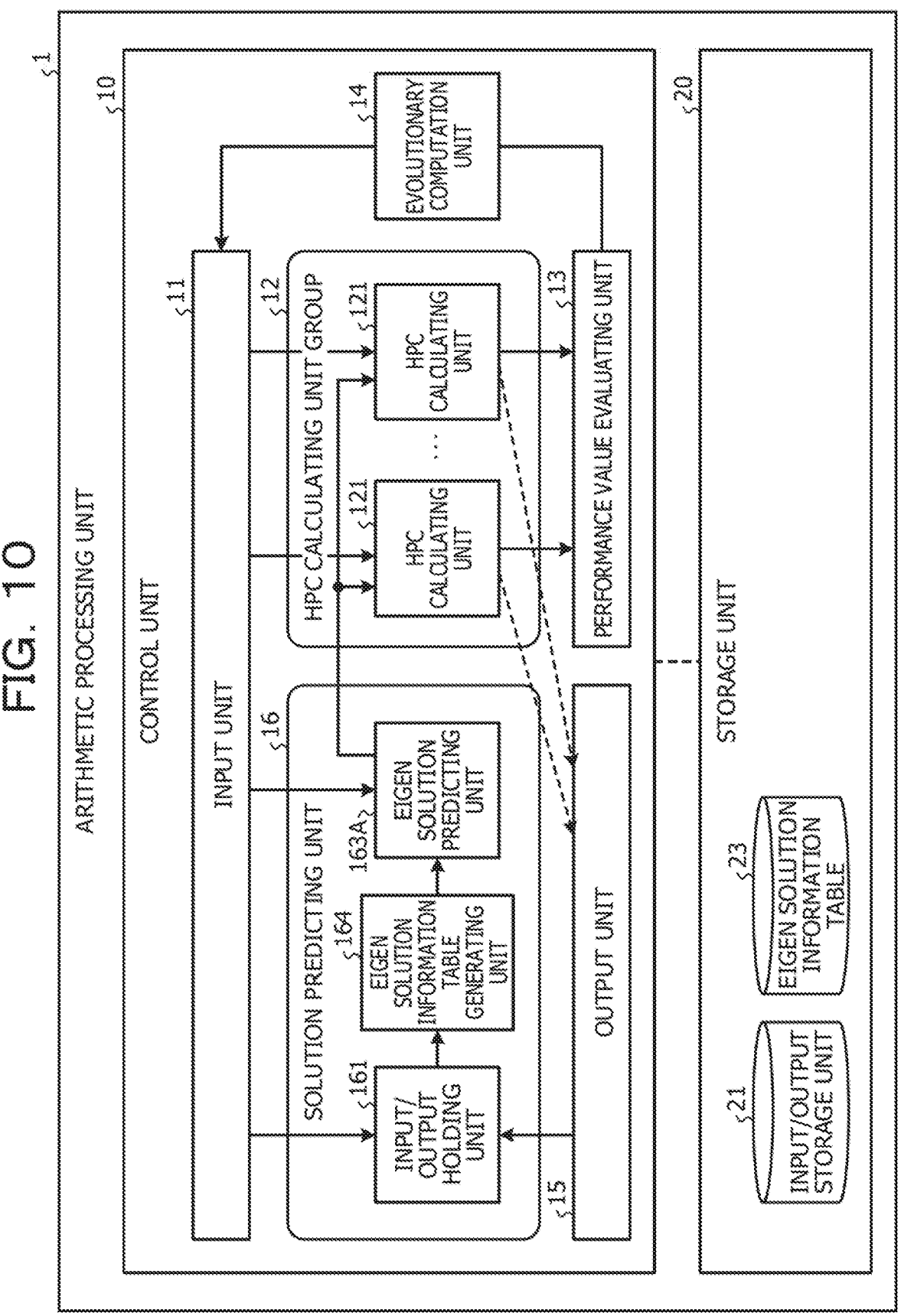
FIG. 10 is a functional block diagram illustrating a configuration of an arithmetic processing unit according to Embodiment 3.

FIG. 10 is a functional block diagram illustrating a configuration of the arithmetic processing unit according to Embodiment 3. Elements of the arithmetic processing unit of FIG. 10 are designated with the same reference numerals as in the arithmetic processing unit 1 of FIG. 1, and the discussion of the identical elements and operation thereof is omitted herein. Embodiment 1 and Embodiment 3 are different in that the model generating unit 162 is replaced by an eigen solution information table generating unit 164. They are also different in that the eigen solution predicting unit 163 is replaced by an eigen solution predicting unit 163A. They are also different in that the learning model 22 is replaced by the eigen solution information table 23.

The eigen solution information table 23 is a table that stores eigen solutions for a plurality of input values. An example of the eigen solution information table 23 will be described with reference to FIG. 11. FIG. 11 is a diagram illustrating an example of the eigen solution information table according to Embodiment 3. As illustrated in FIG. 11, the eigen solution information table 23 stores input values $x_{km}$ and eigen solutions $g(x_{km})$ in association. k indicates a generation, and m indicates an input value number within the generation. As an example, when the input value $x_{km}$ is $x_{02}$, "111 . . . 1" is stored as values of $x_{02}$, and "12" is stored as the eigen solution $g(x_{km})$.

Referring back to FIG. 10, the eigen solution information table generating unit 164 generates the eigen solution information table 23. For example, the eigen solution information table generating unit 164 holds, in the eigen solution information table 23, an input value and an eigen solution of each of several generations, which are stored in the input/output storage unit 21 and searched by the entire range search.

The eigen solution predicting unit 163A predicts an eigen solution for an input value by using the eigen solution information table 23. For example, the eigen solution predicting unit 163A predicts an eigen solution for an input value of a new generation by using the eigen solution information table 23. As an example, when an input value of a new generation is the closest to $x_{02}$, the eigen solution predicting unit 163A predicts the eigen solution $g(x_{02})$ for the closest input value $x_{02}$ as an eigen solution for the input value of the new generation. As another example, when an input value of a new generation is close to $x_{02}$ and $x_{53}$, the eigen solution predicting unit 163A predicts a solution interpolated from the eigen solutions for the close input values as an eigen solution for the input value of the new generation. For example, the eigen solution predicting unit 163A predicts an average value of $g(x_{02})$ and $g(x_{53})$ as an eigen solution for the input value of the new generation.

Embodiment 4

According to Embodiment 1, the arithmetic processing unit 1 generates the learning model 22 that predicts in which range an eigen solution for an input value exists based on eigen solutions for input values from the first generation to the mth generation searched by the entire range search. The arithmetic processing unit 1 predicts a solution candidate range of the eigen solution for the input value from input values of the (m+1)th generation by using the generated learning model 22 and performs partial range search that searches the eigen solution from the solution candidate range. However, the arithmetic processing unit 1 is not limited thereto but may generate a frequency distribution of a data section (corresponding to the solution candidate range) including eigen solutions with respect to eigen solutions for input values from the 1st to the mth generation, which are searched by the entire range search. The arithmetic processing unit 1 may perform partial range search that searches an eigen solution from a data section having a high frequency by using the generated frequency distribution from the input values of the (m+1)th generation.

For example, it is assumed that the solution candidate range is divided into 20 ranges for 500 points acquired by dividing 1000 points by 20. When a little less than 40% of the entire eigen solutions fits within a specific solution candidate range, the amount of characteristic computational complexity of input values for one search is 62% (0.62=0.4× 1/20+0.6×1). In other words, for example, when the eigen solution frequency distribution according to Embodiment 4 is used, the arithmetic processing unit 1 may reduce the amount of computational complexity of evolutionary computation to 2/3, compared with a case where entire range search is performed.

[Effects of Embodiment 4]

According to Embodiment 4, the arithmetic processing unit 1 calculates a first eigen solution for a first input value based on a predetermined eigen solution condition. The arithmetic processing unit 1 generates an eigen solution frequency distribution for a set of a plurality of eigen solution ranges based on the first input value and the first eigen solution being a result of the calculation. The arithmetic processing unit 1 predicts a range of an eigen solution for the second input value by using the eigen solution frequency distribution. With this configuration, the arithmetic processing unit 1 predicts the range of an eigen solution by using the eigen solution frequency distribution so that the amount of computational complexity for calculating an eigen solution may be reduced. As a result, the arithmetic processing unit 1 may reduce the entire amount of computational complexity of evolutionary computation.

[Another Example Using Eigen Solution Prediction]

Figure 12:
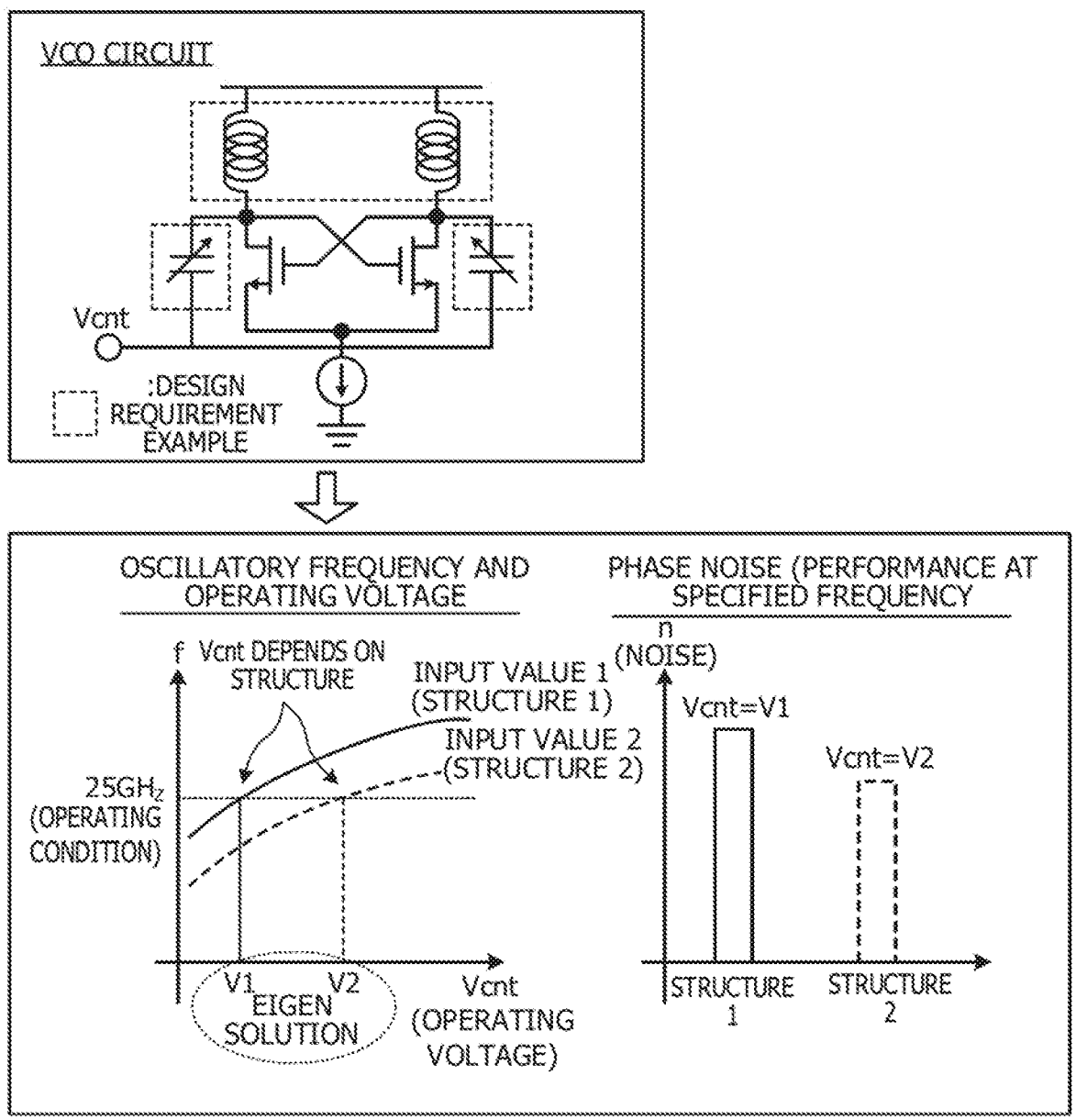
FIG. 12 is a diagram illustrating another example using eigen solution prediction according to Embodiments 1 to 4.

With the eigen solution prediction according to Embodiments 1 to 4, an optical SAW filter is designed. Another example using the eigen solution prediction according to Embodiments 1 to 4 will be described with reference to FIG. 12. FIG. 12 is a diagram illustrating another example using the eigen solution prediction according to Embodiments 1 to 4. With reference to FIG. 12, a case will be described in which a design of a voltage control oscillator (VCO) is acquired by an evolutionary computation.

The upper drawing of FIG. 12 illustrates a VCO circuit. Examples of design requirements are enclosed by broken lines.

The lower left diagram of FIG. 12 illustrates a relationship between oscillatory frequency and operating voltage. The VCO circuit is used by setting the operating voltage such that the oscillatory frequency operates at a specified value (such as 25.0 GHz) as a target value. In this case, 25.0 GHz is a specified value as the oscillatory frequency f. In a structure represented by an input value 1, when the VCO circuit operates with the specified value, the operating voltage indicates V1. In a structure represented by an input value 2, when the VCO circuit operates with the specified value, the operating voltage indicates V2. In this way, the operating voltage depends on the structure.

The lower right diagram of FIG. 12 illustrates phase noise at specified frequencies. The VCO circuit is required not only to have an oscillatory frequency operating at a specified value but also to have small phase noise in a condition according to the specifications. In this case, the structure 2 represented by the input value 2 have lower phase noise than that of the structure 1 represented by the input value 1. This means that the structure 2 is a more optimum structure than the structure 1.

Under this design summary of the VCO circuit, input values (design requirements regarding a structure and parameter values) for an inductor and a variable capacitance are adjusted in the design process to search an optimum structure. However, when the input values are changed, the operating voltage for the input values changes. Therefore, the operating voltage (Vcnt) having the specified oscillatory frequency f is predicted every time in accordance with the input values, and the phase noise is required to be evaluated under conditions based on the specifications.

Accordingly, for example, design requirements of the structure and parameters of the VCO circuit are associated with the "input value" according to Embodiment 1. The operating voltage under the specification condition for the input value is associated with the "eigen solution". The phase noise under the condition based on the specifications for the input value is associated with the evaluation value. For example a VCO may be designed by using the eigen solution prediction according to Embodiment 1 as follows.

The HPC calculating unit 121 receives an input value regarding a design requirement of a predetermined generation, and searches an operating voltage satisfying the specification condition for the input value through the possible entire range of the operating voltage.

Based on the operating voltage for the input value, which is searched by the entire range search, the model generating unit 162 generates the learning model 22 that predicts the range in which the operating voltage satisfying the specification condition for the input value exists.

The eigen solution predicting unit 163 uses the learning model 22 to predict the range (solution candidate range) in which the operating voltage for the input values exists. The eigen solution predicting unit 163 predicts the operating voltage for the input value, which satisfies the specification condition for the input value, within the predicted operating voltage range. If the prediction of the operating voltage fails, the eigen solution predicting unit 163 may cause the HPC calculating unit 121 to search the operating voltage for the input value by performing the entire range search.

The performance value evaluating unit 13 calculates phase noise for the input value based on the predicted or searched operating voltage. The performance value evaluating unit 13 evaluates the phase noises (performances) of the input values based on the phase noises of the input values. The evolutionary computation unit 14 may evolve the input values based on the evaluation result of the phase noises of the input values, predict the operating voltage for the input values, and finally select an optimum input value.

[Flowchart for Evolutionary Computation]

Figure 13:
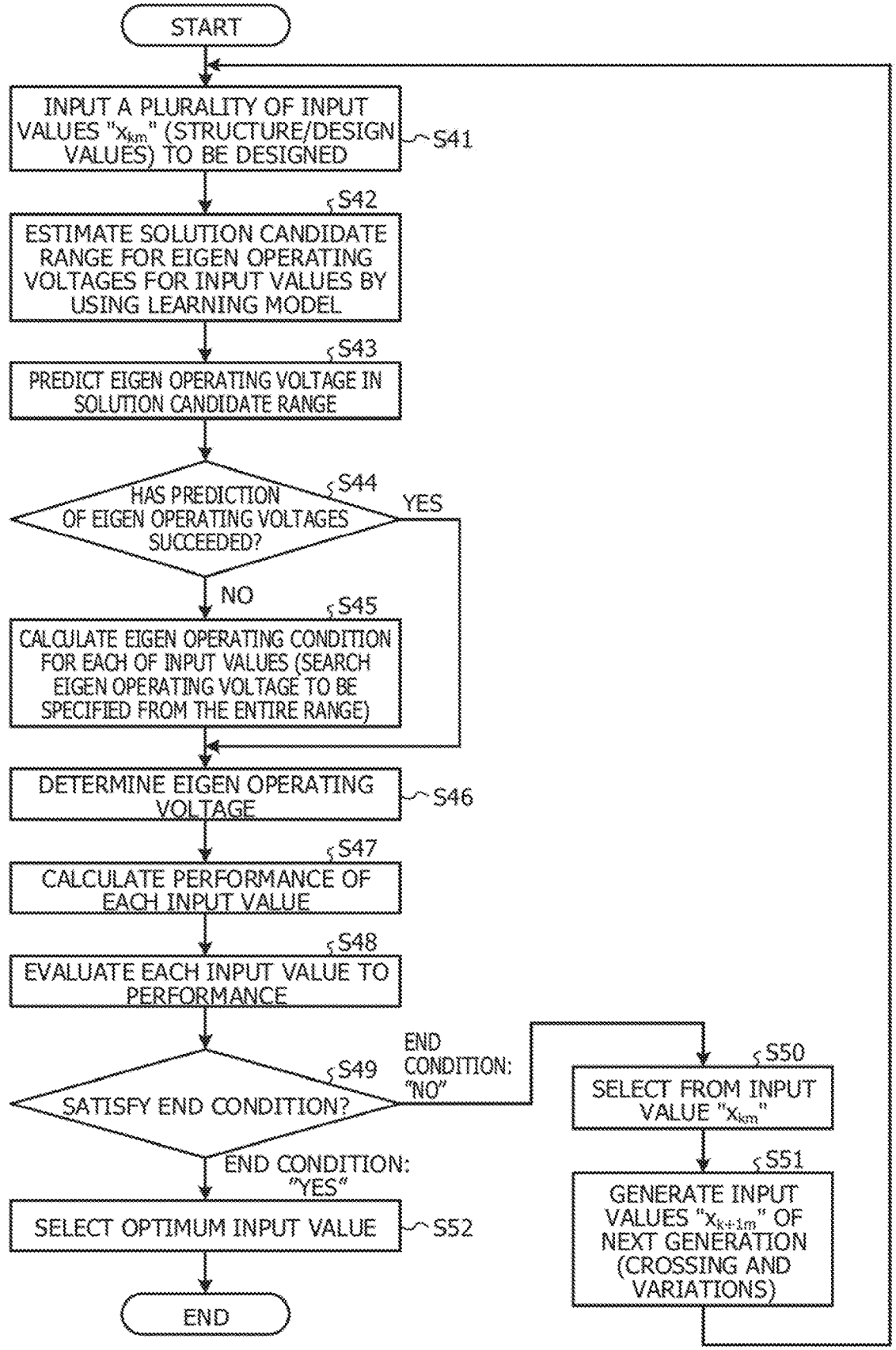
FIG. 13 is a diagram illustrating an example of a flowchart for structure design with evolutionary computation according to another example.

FIG. 13 is a diagram illustrating an example of a flowchart for structure design with evolutionary computation according to another example. It is assumed that the learning model 22 is generated by the model generating unit 162. The initial value of the generation k is assumed to be the threshold value used for the model generation+1.

As illustrated in FIG. 13, the input unit 11 inputs a plurality of input values "$x_{km}$" to be designed (structures/design values) (step S41).

By using the learning model 22, the eigen solution predicting unit 163 estimates a solution candidate range for eigen operating voltage for input values (step S42). The eigen solution predicting unit 163 predicts an eigen operating voltage in the solution candidate range (step S43).

The eigen solution predicting unit 163 determines whether the eigen operating voltage prediction has succeeded or not (step S44). If it is determined that the eigen operating voltage prediction has succeeded (Yes in step S44), the eigen solution predicting unit 163 moves to step S46.

On the other hand, if it is determined that the eigen operating voltage prediction has not succeeded (No in step S44), the HPC calculating unit 121 calculates eigen operating voltages for the input values "$x_{km}$" (step S45). In other words, for example, the HPC calculating unit 121 calculates an eigen operating voltage by searching an eigen operating voltage being a specification from the entire range. The HPC calculating unit 121 moves to step S46.

In step S46, the HPC calculating unit 121 determines the eigen operating voltage for each of the input values (step S46).

The performance value evaluating unit 13 calculates the performances of the input values (step S47). For example, the performance value evaluating unit 13 calculates phase noises from the eigen operating voltages for the input values. The performance value evaluating unit 13 evaluates the performances of the input values based on the phase noises of the input values (step S48).

The performance value evaluating unit 13 determines whether an end condition is satisfied or not (step S49). If it is determined that the end condition is not satisfied (No in step S49), the evolutionary computation unit 14 selects input values from the current input values "$x_{km}$" based on the evaluation results (step S50).

The evolutionary computation unit 14 generates input values "$x_{k+1m}$" of the next generation (step S51). For example, the evolutionary computation unit 14 crossovers the selected input values and changes the crossed input value to generate the input values of the next generation. The evolutionary computation unit 14 moves to step S41 for processing on the next generation.

On the other hand, if it is determined that the end condition is satisfied (Yes in step S49), the performance value evaluating unit 13 selects an optimum input value based on the results of the performance evaluations for the input values (step S52). The evolutionary computation processing ends.

[Effects of Other Example]

Thus, the arithmetic processing unit 1 in designing a VCO predicts an operating voltage by using the range of the operating voltage for an input value satisfying the specification requirement so that the entire amount of computational complexity of the evolutionary computation may be reduced. In other words, for example, if the search for the operating voltage (corresponding to the eigen solution) having a specified oscillatory frequency for each input value may be predicted, the arithmetic processing unit 1 may efficiently evaluate the input value (structure). Therefore, the amount of computational complexity used for designing a VCO may be reduced.

[Others]

The components of the arithmetic processing unit 1 illustrated in the drawings do not necessarily have to be physically configured as illustrated in the drawings. That is, the specific forms of distribution and integration of the arithmetic processing unit 1 are not limited to those illustrated in the drawings, and all or part thereof may be configured to be functionally or physically distributed or integrated in given units in accordance with various loads, usage states, and so on. For example, the output unit 15 and the input/output holding unit 161 may be integrated as one unit. The HPC calculating unit 121 may be divided into a calculating unit that searches an eigen solution by entire range search, a unit that calculates an objective function based on the eigen solution and a unit that calculates a performance value for an input value based on the objective function. The storage unit 20 may be coupled via a network as an external device of the arithmetic processing unit 1.

Figure 14:
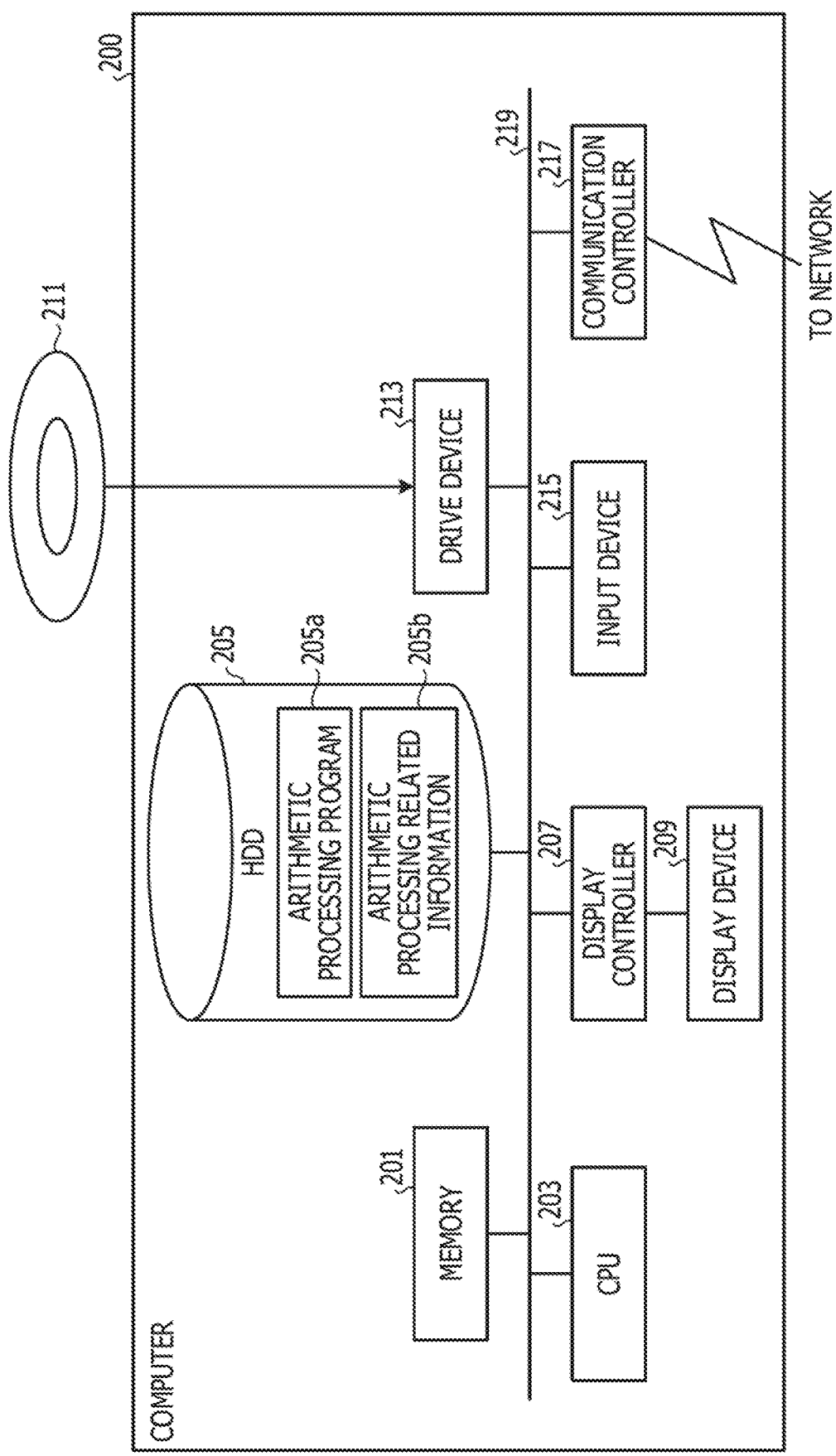
FIG. 14 is a diagram illustrating an example of a computer that executes an arithmetic processing program.
Figure 15A:
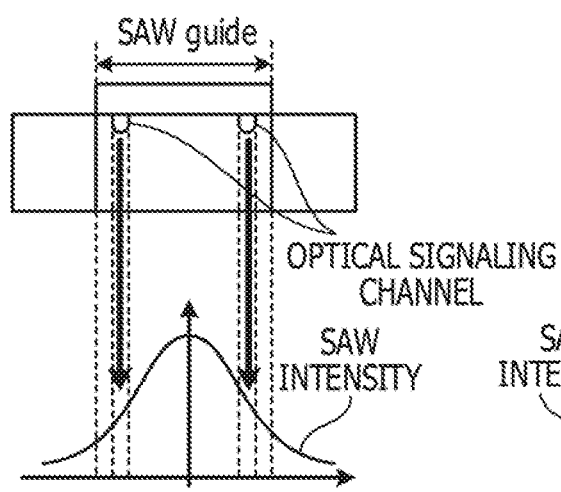
FIGS. 15A and 15B are diagrams illustrating a reference example of an SAW intensity distribution with an optical SAW filter having a highest SAW application efficiency.
Figure 15B:
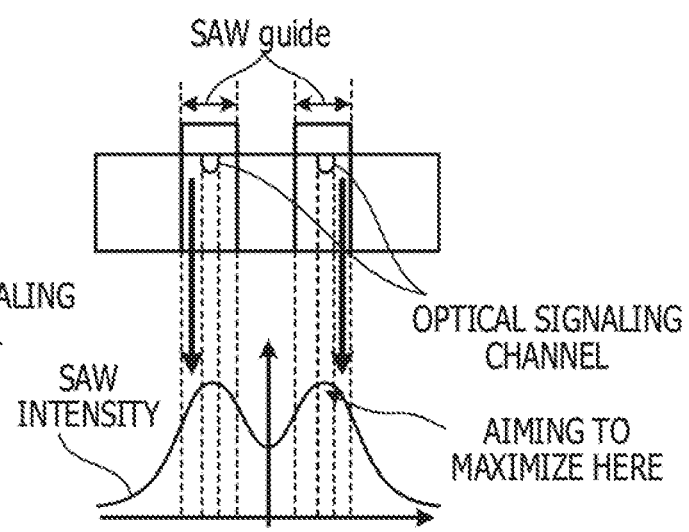
Figure 16:
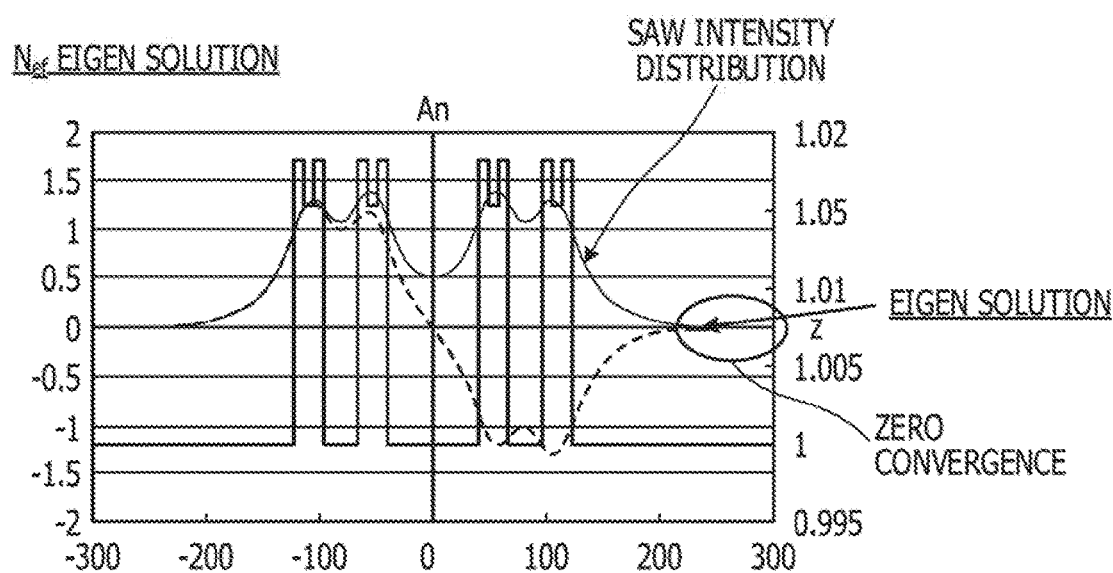
FIG. 16 is a diagram illustrating a reference example exhibiting a relationship between an SAW intensity distribution and an eigen solution.
Figure 16:
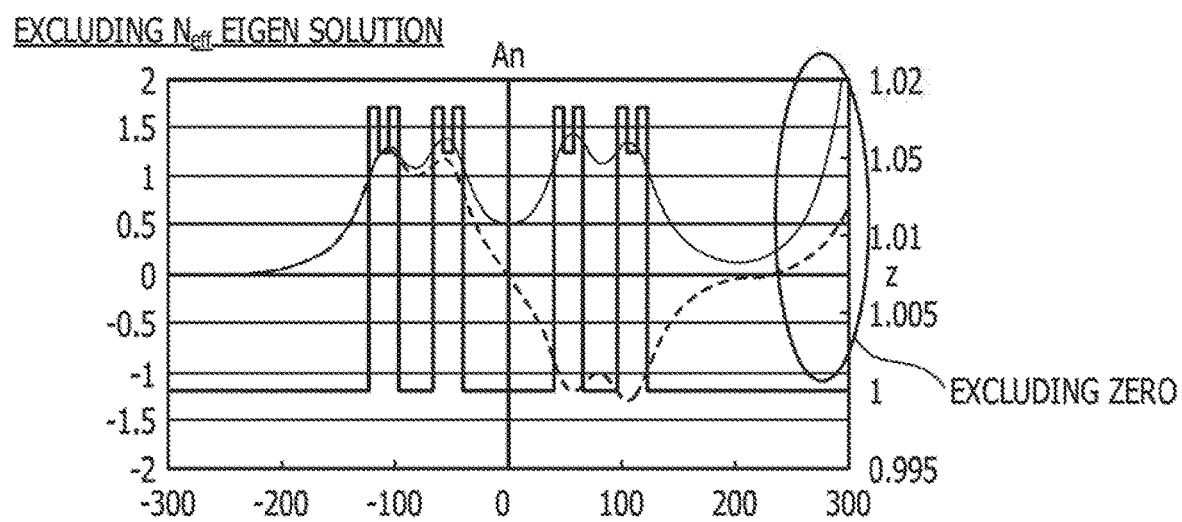

The various processes described in the embodiment above may be implemented as a result of a computer such as a personal computer or a workstation executing a program prepared in advance. Hereinafter, an example of a computer that executes the arithmetic processing program implementing functions that are the same as those of the arithmetic processing unit 1 illustrated in FIG. 1 will be described. FIG. 14 is a diagram illustrating an example of a computer that executes the arithmetic processing program.

As illustrated in FIG. 14, a computer 200 includes a CPU 203 that performs various kinds of arithmetic processing, an input device 215 that accepts input of data from a user, and a display controller 207 that controls a display device 209. The computer 200 also includes a drive device 213 that reads a program or the like from a storage medium, and a communication controller 217 that exchanges data with another computer via a network. The computer 200 also includes a memory 201 that temporarily stores various kinds of information, and a hard disk drive (HDD) 205. The memory 201, the CPU 203, the HDD 205, the display controller 207, the drive device 213, the input device 215, and the communication controller 217 are coupled to one another via a bus 219.

The drive device 213 is, for example, a device for a removable disk 211. The HDD 205 stores an arithmetic processing program 205a and arithmetic processing related information 205b.

The CPU 203 reads the arithmetic processing program 205a, develops the estimation program 205a in the memory 201, and executes the arithmetic processing program 205a as a process. Such processes correspond to the respective functional units of the arithmetic processing unit 1. The arithmetic processing related information 205b corresponds to the input/output storage unit 21 and the learning model 22. For example, the removable disk 210 stores various information of the arithmetic processing program 205a or the like.

The arithmetic processing program 205a may not necessarily have to be stored in the HDD 205 from the beginning. For example, the arithmetic processing program 205a may be stored in a "portable physical medium" such as a flexible disk (FD), a compact disk read-only memory (CD-ROM), a digital versatile disk (DVD), a magneto-optical disk, or an integrated circuit (IC) card inserted into the computer 200. The computer 200 may execute the arithmetic processing program 205a by reading the arithmetic processing program 205a from the portable physical medium.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus, comprising:
   a memory; and
   a processor coupled to the memory and the processor configured to execute a prediction process and a search process in an evolutionary calculation process for searching an optimum value of inputs by calculating an objective function based on eigen solutions for inputs and repeatedly calculating the objective function, wherein
   the prediction process includes predicting a range of an eigen solution for a second input, which satisfies a predetermined eigen solution condition, based on a first eigen solution for a first input when searches an optimum value of inputs by calculating an objective function based on eigen solutions for inputs and repeatedly calculating the objective function, and
   the search process includes searching a second eigen solution for the second input, which satisfies the eigen solution condition, in the predicted range of the eigen solution.

2. The arithmetic processing apparatus according to claim 1,
   wherein the prediction process includes a calculation process and a generation process, the calculation process including calculating a first eigen solution for a first input based on a predetermined eigen solution condition, and the generation process including generating a model that predicts a range of an eigen solution satisfying the eigen solution condition based on the first input and the first eigen solution being a result of the calculation,
   wherein the prediction process includes predicting a range of an eigen solution for the second input by using the model.

3. The arithmetic processing apparatus according to claim 2,
   wherein the generation process includes generating the model based on the first input and the first eigen solution of a plurality of generations before a predetermined generation when the second input is an input of the predetermined generation.

4. The arithmetic processing apparatus according to claim 1,
   wherein the prediction process includes a calculation process and a generation process, the calculation process including calculating a first eigen solution for a first input based on a predetermined eigen solution condition, and the generation process including generating an eigen solution frequency distribution for a set of a plurality of eigen solution ranges based on the first input and the first eigen solution being a result of the calculation,
   wherein the prediction process includes predicting a range of an eigen solution for the second input by using the eigen solution frequency distribution.

5. The arithmetic processing apparatus according to claim 1,
   wherein the evolutionary calculation process includes a calculation process and an evaluation process and a generation process, the calculation process including calculating an objective function based on a second eigen solution for the second input, the evaluation process including evaluating a performance for the second input based on the objective function calculated by the calculation process; and the generation process including generating a new second input from the second input based on the performance value evaluated by the evaluation process ,
   wherein processing by the prediction process, processing by the search process, processing by the calculation process, processing by the evaluation process, processing by the generation process are repeated in response to the new second input.

6. A non-transitory computer-readable storage medium storing a program that causes a computer to execute a search process for searching an optimum value of inputs by calculating an objective function based on eigen solutions for inputs and repeatedly calculating the objective function, the search process comprising:
   predicting a range of an eigen solution for a second input, which satisfies a predetermined eigen solution condition, based on a first eigen solution for a first input; and searching a second eigen solution for the second input, which satisfies the eigen solution condition, in the predicted range of the eigen solution.

7. An arithmetic processing method to be executed by a computer, the arithmetic processing method for searching an optimum value of inputs by calculating an objective function based on eigen solutions for inputs and repeatedly calculating the objective function, the arithmetic processing method comprising:

predicting a range of an eigen solution for a second input, which satisfies a predetermined eigen solution condition, based on a first eigen solution for a first input; and searching a second eigen solution for the second input, which satisfies the eigen solution condition, in the predicted range of the eigen solution.

* * * * *